US006910093B2

(12) United States Patent
Porterfield

(10) Patent No.: US 6,910,093 B2
(45) Date of Patent: Jun. 21, 2005

(54) METHOD OF PACING AND DISCONNECTING TRANSFERS ON A SOURCE STROBED BUS

(75) Inventor: A. Kent Porterfield, New Brighton, MN (US)

(73) Assignee: Micron Technology, Inc., Boise, ID (US)

( * ) Notice: Subject to any disclaimer, the term of this patent is extended or adjusted under 35 U.S.C. 154(b) by 439 days.

(21) Appl. No.: 09/730,774

(22) Filed: Dec. 7, 2000

(65) Prior Publication Data

US 2002/0112104 A1 Aug. 15, 2002

(51) Int. Cl.[7] .............................................. G06F 13/00
(52) U.S. Cl. ...................... 710/316; 710/306; 710/313
(58) Field of Search ................................ 710/306, 309, 710/311, 313, 316, 1, 11, 60, 52, 38, 112, 263, 114; 375/219; 370/284; 714/724, 31, 33, 38, 733

(56) References Cited

U.S. PATENT DOCUMENTS

| | | | | |
|---|---|---|---|---|
| 4,602,327 A | * | 7/1986 | LaViolette et al. | ......... 710/107 |
| 5,101,478 A | * | 3/1992 | Fu et al. | ......... 710/1 |
| 5,796,960 A | | 8/1998 | Bicevskis et al. | |
| 5,991,833 A | | 11/1999 | Wandler et al. | |
| 6,029,223 A | | 2/2000 | Klein | |
| 6,047,349 A | | 4/2000 | Klein | |
| 6,070,215 A | | 5/2000 | Deschepper et al. | |
| 6,073,186 A | * | 6/2000 | Murray et al. | ......... 710/11 |
| 6,092,219 A | | 7/2000 | Porterfield | |
| 6,094,700 A | | 7/2000 | Deschepper et al. | |
| 6,145,039 A | * | 11/2000 | Ajanovic et al. | ......... 710/105 |
| 6,279,064 B1 | * | 8/2001 | Bronson et al. | ......... 710/112 |
| 6,324,596 B1 | * | 11/2001 | Houg | ......... 710/19 |
| 6,463,092 B1 | * | 10/2002 | Kim et al. | ......... 375/219 |
| 6,513,091 B1 | * | 1/2003 | Blackmon et al. | ......... 710/316 |
| 6,530,047 B1 | * | 3/2003 | Edwards et al. | ......... 714/724 |
| 2002/0112119 A1 | | 8/2002 | Halbert et al. | |

* cited by examiner

Primary Examiner—Khanh Dang
(74) Attorney, Agent, or Firm—Dickstein Shapiro Morin & Oshinsky LLP

(57) ABSTRACT

A hub based computer system having a central hub that communicates with a plurality of satellite devices over respective link buses. Each link bus is substantially the same and adheres to a predefined link bus protocol. The satellite devices are also connected to industry standard buses/devices. All components within the system are capable of communicating with each other through the hub. Each link bus includes a status line that allows each device connected to the same link bus to accept, deny, or delay a data transfer on the link bus. If accepted, the same status line can be used by the transferor and target of a data transfer, if necessary, to stall or pace the transfer as needed. The link bus protocol establishes a window in which the status line may convey data transfer disconnecting or pacing status information. The protocol further includes a method of retrying or aborting transfers based on the disconnecting status information.

69 Claims, 15 Drawing Sheets

METHOD OF PACING AND DISCONNECTING TRANSFERS ON A SOURCE STROBED BUS

FIELD OF THE INVENTION

The invention relates to computer systems, and more particularly to a method of pacing and disconnecting transfers on a source strobed computer system bus.

BACKGROUND OF THE INVENTION

Several of today's computer system architectures employ a source strobed bus and method to transfer data between devices. In a typical source strobe architecture, the transmitting device transmits to the receiving device a clock signal/strobe and data. The strobe alerts the receiving device that valid data has been transmitted over the bus. Computer bus architectures such as AGP (accelerated graphics port), DDR SDRAM (double data rate synchronous dynamic random access memory), and RDRAM (Rambus random access memory) utilize source strobes in this manner.

A source strobe data bus is an efficient mechanism for transferring large amounts of data on a minimum number of pins or connections between devices. Often times at least one of the devices connected to the source strobed bus is also connected to another bus, such as an industry standard bus. Examples of industry standard buses includes the PCI (peripheral component interconnect) and PCI-X (peripheral component interconnect extended) buses. Thus, a device may receive data from the source strobed bus, process the data and then transmit the processed data over the industry standard bus to another device.

There will be times, however, when the device connected to the additional bus is unable to accept a data transfer from the source strobe bus. This may arise, for example, when the ordering rules or bus protocol of the additional bus dictates that the receiving device should not receive data at that time. In addition, there may be times when the receiving device has become disconnected from the source strobed bus or is otherwise incapable of acting on the transfer due to a power-down or other condition. This inability to accept the transfer must be communicated to the transferor of the data can disconnect the transfer as soon as possible. Once disconnected, the transferor must be able to reschedule (if the target is connected, but not ready to accept the transfer at the moment) or abort/cancel (if the target is disconnected, etc.) the data transfer to avoid unnecessary delays, erroneous data processing or a deadlock within the system.

Unnecessary delays, erroneous data processing and deadlocking conditions would severely impact system performance. Thus, there is a desire and need to disconnect transfers on a source strobe bus in an efficient and timely manner so that system performance is not adversely impacted when a receiving device cannot accept a data transfer.

At noted earlier, large amounts of data can be transferred over the source strobed bus. As such, there will be times when the receiving device is incapable of completing a data transfer. This may arise, for example, when the input buffers of the receiving device become full and are no longer capable of receiving more data. If this happens, data transferred to the receiving device will be dropped, which may lead to erroneous processing or deadlock conditions within the system.

Other times, the receiving device may not have an outlet for the data (i.e., the device/bus the receiving device is connected to cannot accept data due to e.g., a bottleneck condition). Although the receiving device can accept the data from the transferor, the receiving device will have no where to send the data. The inability to complete the data transfer must be communicated to the transferor so that the transferor can pace the transfer in a manner in that allows the receiving device time to complete the transfer. Thus, there is a desire and need to pace transfers on a source strobe bus in an efficient and timely manner so that system performance is not adversely impacted when a data transfer must be stalled.

SUMMARY OF THE INVENTION

The invention provides a mechanism to disconnect transfers on a source strobe bus in an efficient and timely manner so that system performance is not adversely impacted when a receiving device cannot accept a data transfer.

The invention also provides a mechanism to pace transfers on a source strobe bus in an efficient and timely manner so that system performance is not adversely impacted when a data transfer must be stalled.

The above and other features and advantages are achieved by a hub based computer system having a central hub that communicates with a plurality of satellite devices over respective link buses. Each link bus is substantially the same and adheres to a predefined link bus protocol. The satellite devices are also connected to industry standard buses/devices. All components within the system are capable of communicating with each other through the hub. Each link bus includes a status line that allows each device connected to the same link bus to accept, deny, or delay a data transfer on the link bus. If accepted, the same status line can be used by the transferor and target of a data transfer, if necessary, to stall or pace the transfer as needed. The link bus protocol establishes a window in which the status line may convey data transfer disconnecting or pacing status information. The protocol further includes a method of transferring, retrying, or aborting data transfers based on the disconnecting status information in an efficient and timely manner.

BRIEF DESCRIPTION OF THE DRAWINGS

The above and other advantages and features of the invention will be more clearly understood from the following detailed description of the invention, which is provided in connection with the accompanying drawings in which.

DETAILED DESCRIPTION OF THE PREFERRED EMBODIMENTS

Figure 1:
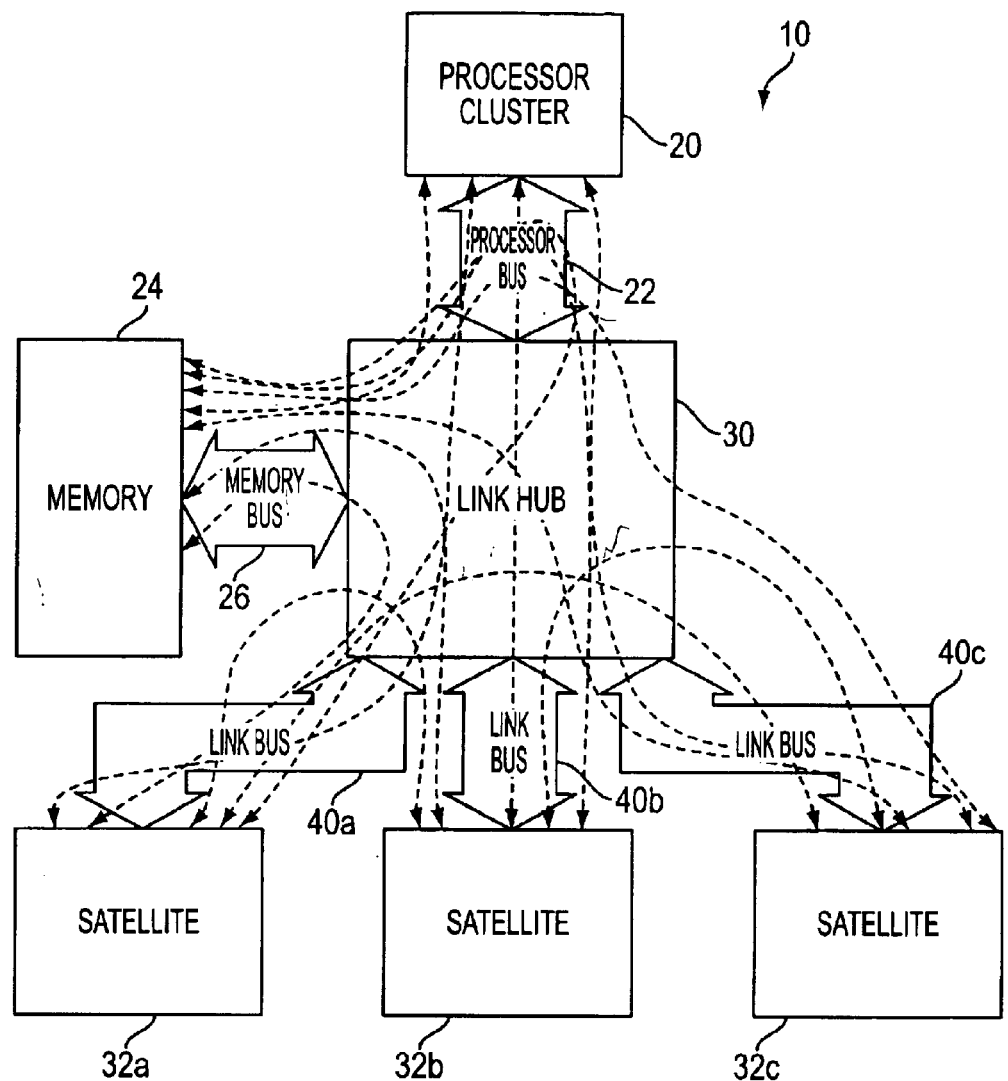
FIG. 1 is a hub based computer system constructed in accordance with an exemplary embodiment of the invention.

FIG. 1 is a hub based computer system 10 utilizing link buses 40a, 40b, 40c (collectively referred to herein as "link buses 40") in accordance with an exemplary embodiment of the invention. The system 10 includes a processor cluster 20, a memory device 24, a link hub 30 and a plurality of satellite devices 32a, 32b, 32c (collectively referred to herein as "satellite devices 32"). The processor cluster 20 may contain one or many processor units. Although not required to practice the invention, if more than one processing unit is contained within the cluster 20, they are preferably identical to each other. The satellite devices 32 can be bridges or hubs to industry standard buses, such as e.g., PCI, PCI-X and AGP, or the devices 32 can be other components typically found in a computer system. The devices 32 can be connected to one or more I/O devices if so desired.

The link hub 30 is connected to the processor cluster 20 by a dedicated processor bus 22. The link hub 30 is connected to the memory device 24 by a dedicated memory bus 26. It is desirable to used dedicated processor and memory buses 22, 26 to minimize any latencies on transfers to/from the processor cluster 20 and to/from the memory device 24. The link hub 30 is connected to each satellite device 32a, 32b, 32c by a link bus 40a, 40b, 40c (collectively referred to herein as "link buses 40"). Each link bus 40a, 40b, 40c is substantially the same. As will be described below in more detail, each link bus 40a, 40b, 40c adheres to a predefined link bus protocol, which makes the interface between the link hub 30 and the devices 32 generic. With these connections to the link hub 30, every component in the system can communicate with each other through the hub 30. Possible communication paths between the system components are represented by the dashed-lines on FIG. 1.

As will become apparent, the use of the link buses 40 and link bus protocol allows for the transferring, retrying, aborting, or stalling data transfers in an efficient and timely manner, which prevents deadlocks, bottlenecks, etc. and improves the performance of the system 10. The transferring, retrying, aborting, and stalling operations are performed based on time-multiplexed transfer pacing and disconnecting status information that is transmitted in accordance with the link bus protocol.

It is desirable that the system 10 be a high performance, I/O intensive computer system. For example, the system 10 may be a server computer system or a computer workstation. It should be apparent that the invention is not limited to a particular type of environment/system or to particular devices 32 used in the system 10. All that is required to practice the invention is to provide a link bus 40 between the link hub 30 and the satellite devices 32 that must communicate with other satellite devices 32, processor cluster 20 or memory device 24. In addition, each satellite device and the link hub 30 must adhere to the link bus protocol.

A brief description of the link bus 40 is now provided. A more detailed description of the link bus 40, as well as the link bus protocol, will be provided below with respect to FIGS. 6–15. Briefly, the link bus 40 is a low pin count, high bandwidth bus that is used to transfer data and exchange messages between the components in the system 10. In a preferred embodiment, the link bus 40 consists of eight or sixteen command/address/data lines, two source strobe clock signal lines and a status signal line (L_ST). Communications over the link bus 40 adhere to a link bus protocol that is described below in more detail.

The link bus is scaleable, and configurable to support high bandwidths such as e.g., 1 giga-byte per second (GB/s) and 500 mega-bytes per second (MB/s). The link bus 40 preferably uses a quad pumping technique that transfers command, address and data information four times per clock period. That is, in a preferred embodiment, the link bus 40 is a quad pumped bus. It should be noted that the link bus 40 could use double pumping (i.e., transfers information two times per clock period) or a single pumping techniques if so desired. Thus, the invention is not limited to a link bus 40 that is a quad pumped bus.

Figure 2:
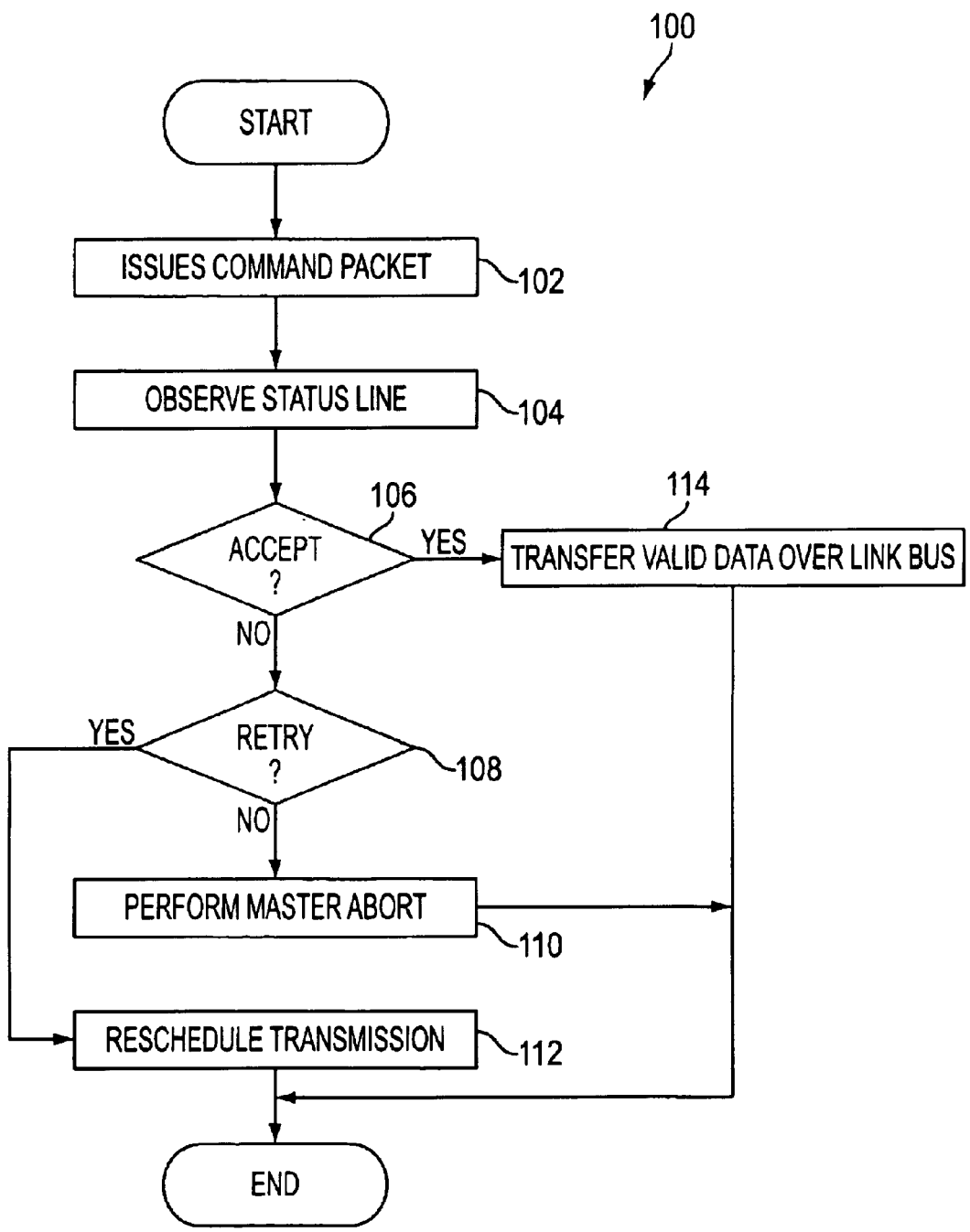
FIGS. 2 and 3 are exemplary methods of pacing transfers on a source strobed bus used in the system illustrated in FIG. 1.
Figure 3:
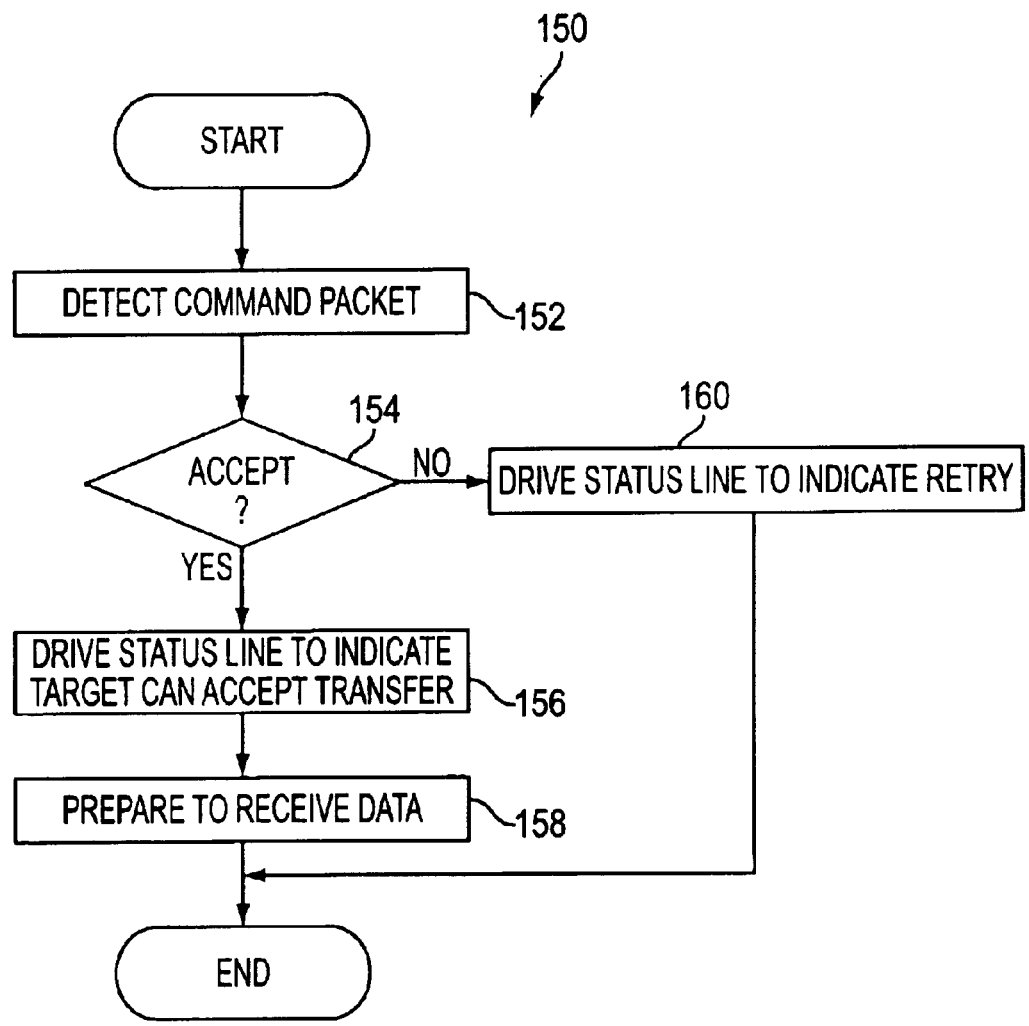
Figure 4:
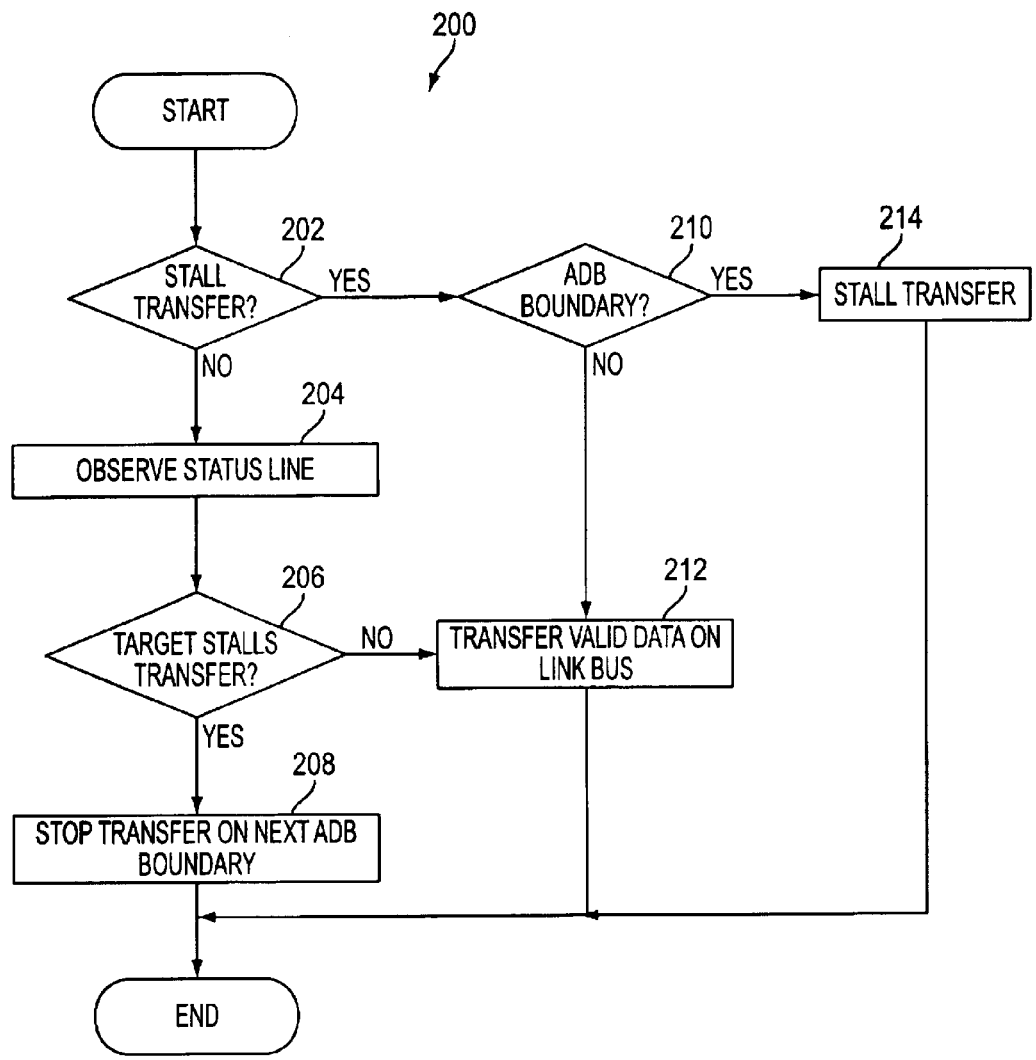
FIGS. 4 and 5 are exemplary methods of disconnecting transfers on a source strobed bud used in the system illustrated in FIG. 1.
Figure 5:
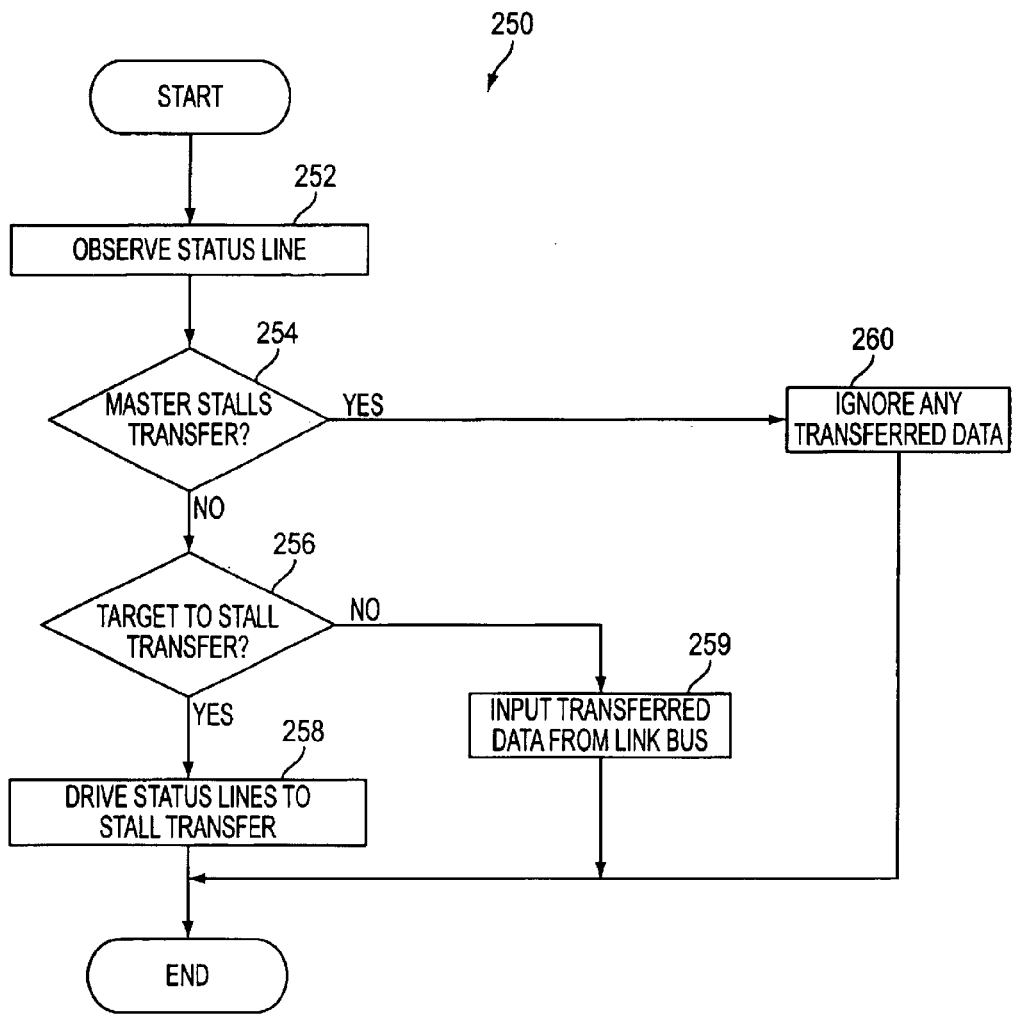

FIGS. 2 and 3 illustrate exemplary methods 100, 150 of initiating and disconnecting data transfers along the link bus 40 in the system 10 illustrated in FIG. 1. The methods 100, 150 as well as the other methods 200, 250 illustrated in FIGS. 4–5, are implemented through the use of respective link buses between each satellite device and the link hub and the link bus protocol described in detail below. The methods 100, 150 allow the devices on the link bus to initiate, accept, decline, retry, or abort a data transfer using the link bus protocol.

Specifically, the methods 100, 150 utilize the link bus status signal line L_ST and the link bus protocol rules (described below with reference to FIGS. 6–15) to time multiplex initial transfer status information ("disconnecting status information") between the device initiating the data transfer ("transferor") and the target of the transfer ("target"). By observing the status line L_ST, obtaining the disconnecting status information, and acting on the disconnecting status information, the methods 100, 150 provide means for transferring, retrying, or aborting data transfers in an efficient and timely manner.

Referring to FIG. 2, the method 100 begins when the transferor issues a command packet on the link bus (step 102). As will be described below in more detail, the command packet alerts the target that a transfer of information is coming (if accepted). The command packet may also contain information about the transfer such as the size, type and attributes of the transfer. Once the command packet is issued, the transferor observes the link bus status line to determine whether the target is capable of accepting the transfer (step 104). That is, the transferor observes the status line to detect and decipher the disconnecting status information. In an exemplary embodiment of the invention, the link bus protocol establishes a two clock cycle window in which the status line should be observed to determine what the disconnecting status information is (i.e., whether the target can accept the transfer now, later or not at all). It should be noted that the invention is not limited to a two clock cycle window and that any size window could be used to practice the invention.

At step 106 the transferor determines from the disconnecting status information if the target has accepted the transfer. If it is determined that the target has accepted the transfer, the transferor initiates the transfer over the link bus in accordance with the command packet (step 114). If; however, at step 106 the disconnecting status information indicates that the target has not accepted the transfer, the method continues at step 108.

At step 108 the transferor determines from the disconnecting status information if the target requested that the transfer be retried. This may arise when the target is unable to complete the transfer at the moment, but will be able to complete it at a later time. If it is determined that a retry has been requested, the transferor reschedules the data transfer for another time (step 112). If at step 108 the disconnecting status information indicates that the target has not accepted the transfer and has not requested that the transfer be retried, then there is a problem with the target and the transfer should be aborted.

As will become apparent from the detailed description of the link bus status line, the status line will contain a pull-up device such as e.g., a resistor. Due to the pull-up device, when the target is disconnected from the link bus or when the target is incapable of acting on a transfer, the signal on the status line will be pulled high. When the transferor observes that the signal on the status line is high during the two clock cycle window, the transferor determines that there is a problem with the target. This will be referred to herein as the "master abort" status. Thus, the disconnecting status information contains a status that is not driven by the target (e.g., master abort) as well as the two status indications driven on the status line by the target (e.g., accept and retry).

In response to the master abort status, the transferor at step 110 performs a master abort operation, Which cancels the transfer (as will be described below). As noted earlier, possible problems with the target could include that the target has become disconnected from the link bus or that the target is in a non-responsive state (such as e.g., a power-down condition or stuck in a software infinite loop). These conditions warrant a master abort to prevent further problems in the system.

Referring to FIG. 3, the target portion of the data transfer disconnecting method 150 is now described. At step 152 the target detects that the master has issued a command packet on the link bus. Once detected, the target decodes the command packet to determine the size, etc. of the transfer. The target must determine if it can accept the subsequent transfer (step 154). The target can do this by observing the status of its input and output buffers, any pertinent bus protocols and ordering rules, or by inspecting any other status information that can indicate whether the target should or should not receive the transfer.

If at step 154 it is determined that the target can accept the transfer, the target drives the status line during the two clock cycle window with the accept status as defined by the link bus protocol (step 156). Once accepted, the target prepares to receive the transfer from the link bus (step 158). If, on the other hand, at step 154 it is determined that the target cannot accept the transfer at this time, the target drives the status line during the two clock cycle window with the retry status as defined by the link bus protocol (step 160).

It should be noted that in this exemplary embodiment, the target does not drive a master abort status. It should be noted, however, that it is possible to define a disconnecting status value that allows the target to drive a master abort (e.g., a target abort) if desired. This could be used, for example, curing times in which the target wishes to temporarily disconnect from the transferor.

FIGS. 4 and 5 illustrate exemplary methods 200, 250 of pacing data transfers along the link bus 40 in the system 10 illustrated in FIG. 1. The methods 200, 250 are implemented through the use of respective link buses between each satellite device and the link hub and the link bus protocol described in detail below. The methods 200, 250 allow the devices on the link bus to pace a data transfer on the link bus using the link bus protocol.

Referring to FIG. 4, the method 200 begins when the transferor of a current data transfer on the link bus determines if the transfer should be stalled (step 202). There will be times when the transferor needs to stall a transfer. It should be noted that how and why the transferor needs to stall the transfer is irrelevant and the invention should not be limited to any particular reason/method for requiring the stall. If it is determined that the transferor needs to stall the transfer (step 202) the method 200 continues at step 210.

At step 210, the transferor determines if the current transfer is on an allowable data boundary (ADB). As will be described below, in an exemplary embodiment, the link bus protocol establishes data units partitioned into ADBs. The protocol further establishes that transfers can only be stalled on ADBs for efficiency purposes (i.e., the data is already partitioned into ADBs and should be paced as it is partitioned). Thus, even though the transferor desires to stall the transfer, the transferor must wait until an ADB before stalling the transfer. If at step 210 it is determined that the transfer is at an ADB, then the transferor stalls the current data transfer (step 214).

A transfer can be stalled by the transferor by driving the link status line in accordance with the link bus protocol. The protocol establishes a window in which pacing status information may be driven onto the link bus status line. In an exemplary embodiment, the transferor may stall the transfer by initially driving the status line low during the window. The protocol also establishes that after the transfer has been stalled, the transferor should drive the status line high before tristating on the next clock cycle. As noted earlier, a pull-up device is connected to the status line, which substantially guarantees stable status information during turn-around times on the status signal. When no data stall is to occur, the pull-up device may be sampled instead of actively driving the status line, which has the effect of speeding up the turn-around cycle.

If at step 210 it is determined that the transfer is not at an ADB, then the transferor must continue with the data transfer. Accordingly, the transferor transfers the next piece of valid data on the link bus (step 212).

If at step 202 it is determined that the transferor does not need to stall the transfer the method 200 continues at step 204. At step 204 the transferor observes the link bus status line to determine if the target has driven any pacing status information on the line. At step 206 the transferor determines from the status line if the target wishes to stall the transfer (i.e., if the target has transmitted the pacing status information during the appropriate window). If it is determined that the target has requested to stall the transfer, the transferor will stop transferring data on the next ADB (step 208). If, on the other hand, at step 206 it is determined that the target has not requested to stall the transfer, the transferor transfers the next piece of valid data on the link bus (step 212).

Referring to FIG. 5, the target portion of the data transfer pacing method 250 is now described. The method 250 begins by having the target observe the link bus status line to see if the transferor has driven the pacing status information (step 252). At step 254 the target determines whether the transferor has requested to stall the data transfer (i.e., the target determines if the pacing status information has been driven onto the status line). If it is determined that the transferor has requested to stall the data transfer, then the target acknowledges the stall and treats any data transferred in this clock cycle as invalid data (step 260). Essentially, the target can ignore any data transferred on the link bus once it determines that the transfer is being stalled by the transferor.

If it is determined at step 254 that the transferor has not requested to stall the data transfer, then the method 250 continues at step 256. At step 256 the target determines whether it needs to stall the data transfer. As noted above, there will be times when the target needs to stall data transfers. The target can e.g., check input and output buffers, bus rules, etc. to determine if it needs to stall the transfer. It should be noted that how and why the target needs to stall the transfer is irrelevant and the invention should not be limited to any particular reason/method for requiring the stall. If the target detects that it needs to stall the transfer, then it will drive the status lines during the window with the data transfer pacing status information (step 258). If the target detects that it does not need to stall the transfer, then it will input the transferred information from the link bus (step 259).

Thus, the methods 100, 150, 200, 250 of the invention allow transferors and targets of information on the link bus to disconnect and/or pace transfers on the bus in an efficient manner. That is, the methods 100, 150, 200, 250, the link bus, and link bus protocol allow for the transferring, retrying, aborting, or stalling data transfers in an efficient and timely manner, which prevents deadlocks, bottlenecks, etc. and improves the performance of the system 10 (FIG. 1).

Referring to FIGS. 6–15, an exemplary link bus and link bus protocol are now described. It should be noted that memory transfers will most likely make up the majority of the transfers across the link bus. Burst operations form the vast majority of transfers from the satellite devices as I/O devices, but partial reads/writes shall also be supported. It is desirable for burst transfers to be aligned on 64-byte boundaries. If a PCI-X device communicates over the link bus, the device will indicate it's intention to transfer up to 4K bytes and if PCI devices are used, PCI pre-fetching can also support bursts greater than 64-bytes. Thus, it is desirable for the link bus to include a mechanism to request 4K bytes of data per request. Partial transfers will transfer less than the minimum burst size. These transfers are primarily partial writes with byte enables. Byte enables must then be encoded in the link bus request phase.

In a preferred implementation of the link bus protocol, each satellite device will appear to software as a bridge of some sort. This allows a simple address decode model for each of the satellite devices. For example, in systems including PCI buses, each satellite device will report as a PCI-PCI bridge and in systems using PCI-X buses, each satellite device will report as a PCI-X-PCI-X bridge. In these example systems, only the south bridge, which may itself be a satellite device, will report as a different device. The PCI bridge model works well to decode transfers from the satellite device going upstream to the link hub. The link hub will, by necessity, need to know the addresses mapped in each of the satellite devices in order to move transfers downstream, and in a lateral direction (peer to peer transfers).

In PCI systems, for example, PCI configuration address space is used to allocate memory resources, as well as other configuration attributes, in the system. Registers within the PCI configuration space are used to define memory and I/O address spaces. This configuration information is used to decide addresses of transfers going both upstream and downstream from the link hub. Addresses that are going downstream must fall within a programmed address range while addresses going upstream must fall outside a programmed address range. Due to the hub based architecture of the system, configuration information must exist in the upstream device (e.g., link hub) and the downstream device (e.g., satellite device). This means that the function of a PCI-PCI bridge, for example, is performed by two independently operating devices—one device initiating downstream transfers and one device initiating upstream transfers.

Thus, the same configuration information must exist in both the satellite device and the link hub. One method of distributing configuration information in a hub based architecture is described in co-pending application Ser. No. 09/730,608, entitled "Link Bus for a Hub Based Computer Architectures," which is hereby incorporated by reference in its entirety.

As noted above, once the link hub and the various devices are configured, data transfers can be made throughout the system. Because some of today's (and future) industry standard buses support split transactions, it is desirable for the link bus protocol to support split transactions as well. For example, the PCI-X standard supports split-transactions to free up the bus. A split-transaction request is issued, and some time later the target of the original request issues a split completion. This is similar to the deferred request of some processor families, which would then be responded to by the target using a defer reply. The split-transaction mechanism is an elegant way to free up the bus for other transactions while a target is kept busy performing the transaction request. The link bus protocol also utilizes the split-transaction mechanism.

Some additional industry standard rules shall also be observed by the link bus protocol. For example, PCI-X includes a status bit that indicates the transfer can use relaxed ordering rules. This will speed up transfers by eliminating buffer flushing along the data path. It is desirable that the link bus protocol include relaxed order status. In addition, PCI-X includes a status bit that indicates the transfer does not need to perform a snoop operation on the processor caches (snooping is a method to detect the freshest datum in the caches, and to ensure memory coherency in a cached system). Transfers of this type may proceed directly to memory without snooping the processor caches. It is desirable that the link bus protocol include a "no snooping" option as well.

In a preferred embodiment, the link bus consists of an 8-bit or a 16-bit command/address/data bus L_CAD and two source strobed clock signals L_STB, L_STB_N as shown below in Table I. The single status signal L_ST is used to exchange flow control information between devices. Optionally, byte enables may be issued coincident with each data phase. Exemplary formats for the L_CAD, L_STB, L_STB_N and L_ST signals will be described below in more detail.

TABLE I

| Signal | Type | Count | Description |
| --- | --- | --- | --- |
| L_CAD[15:0] | In/Out | 16 | Link bus command/address/data |
| L_CAD[17:16] | In/Out | 2 | Optional byte enables for write data. Not needed for all link bus configurations. |
| L_STB | In/Out | 1 | Link bus strobe |
| L_STB_N | In/Out | 1 | Link bus strobe Not |
| L_ST | In/Out | 1 | Link bus status |

Figure 6:
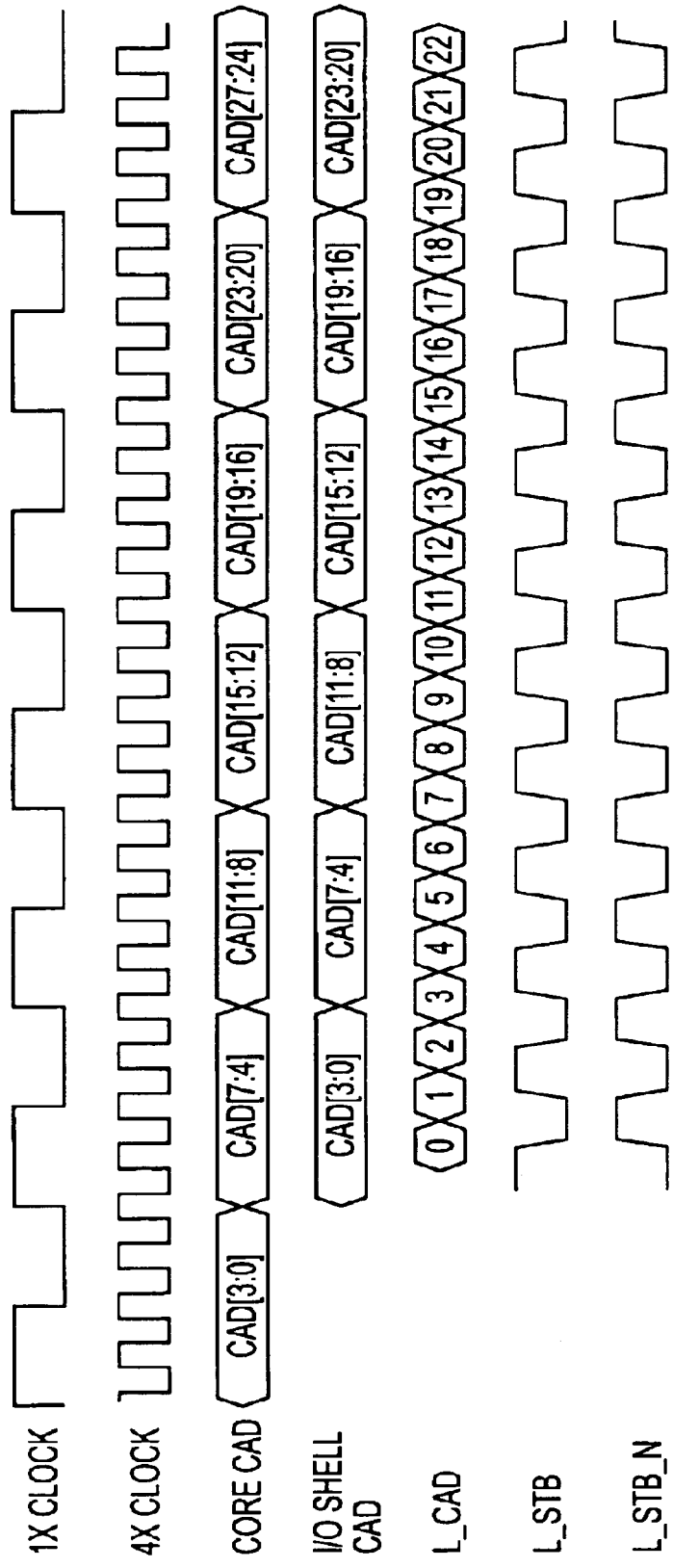
FIGS. 6–8 are timing diagrams illustrating the timing of the transmit and receipt of command/address/data in accordance with an exemplary protocol of the invention.

FIG. 6 is an exemplary diagram illustrating the timing of the transferring of command/address/data onto the link bus by one of the satellite devices (or link hub). In one embodiment of the link bus, the system clock will be distributed internally by a phase-locked loop (PLL) capable of generating both a "1×" clock (i.e., data transferred one-time per clock tick) and "4×" clock (i.e., data transferred four-times per clock tick). FIG. 6 illustrates the 1× and 4× clock signals, command/address/data ("CAD") from the core logic of the device, CAD latched in an I/O shell and the link bus signals L_CAD, L_STB and L_STB_N.

In the transmit waveform of the link bus, CAD is issued from the core logic on the device in the 1× clock domain and captured in an I/O macro (i.e., I/O shell) in the 1× clock domain. Once in the I/O macro, the CAD is multiplexed from the 1× clock domain to the 4× clock domain. Once in the 4× domain, the CAD is driven onto the link bus as the L_CAD signals. The source strobed clock signals L_STB, L_STB_N are also driven onto the link bus to generate strobes at two-times the system clock frequency. The source strobed clock signals L_STB, L_STB_N are driven at two-times the system clock frequency so the target only has to work with one edge of each strobe L_STB, L_STB_N, eliminating concerns about strobe asymmetry.

In an exemplary embodiment, four strobes (i.e., 2 L_STB and 2 L_STB_N strobes) are associated with each clock cycle. In the exemplary embodiment, the link bus protocol will not allow fewer than four strobes per clock cycle. 64-bits of data may therefore be transferred every clock cycle in a 16-bit link bus configuration. Similarly, in a 8-bit link bus configuration, 32-bits of data may be transferred per clock cycle. It is also desirable for data to be transferred along 8-byte address boundaries. Thus, a 16-bit link bus configuration may transfer 8-bytes in one clock cycle, while the 8-bit link bus transfers data in two clocks cycles.

Figure 7:
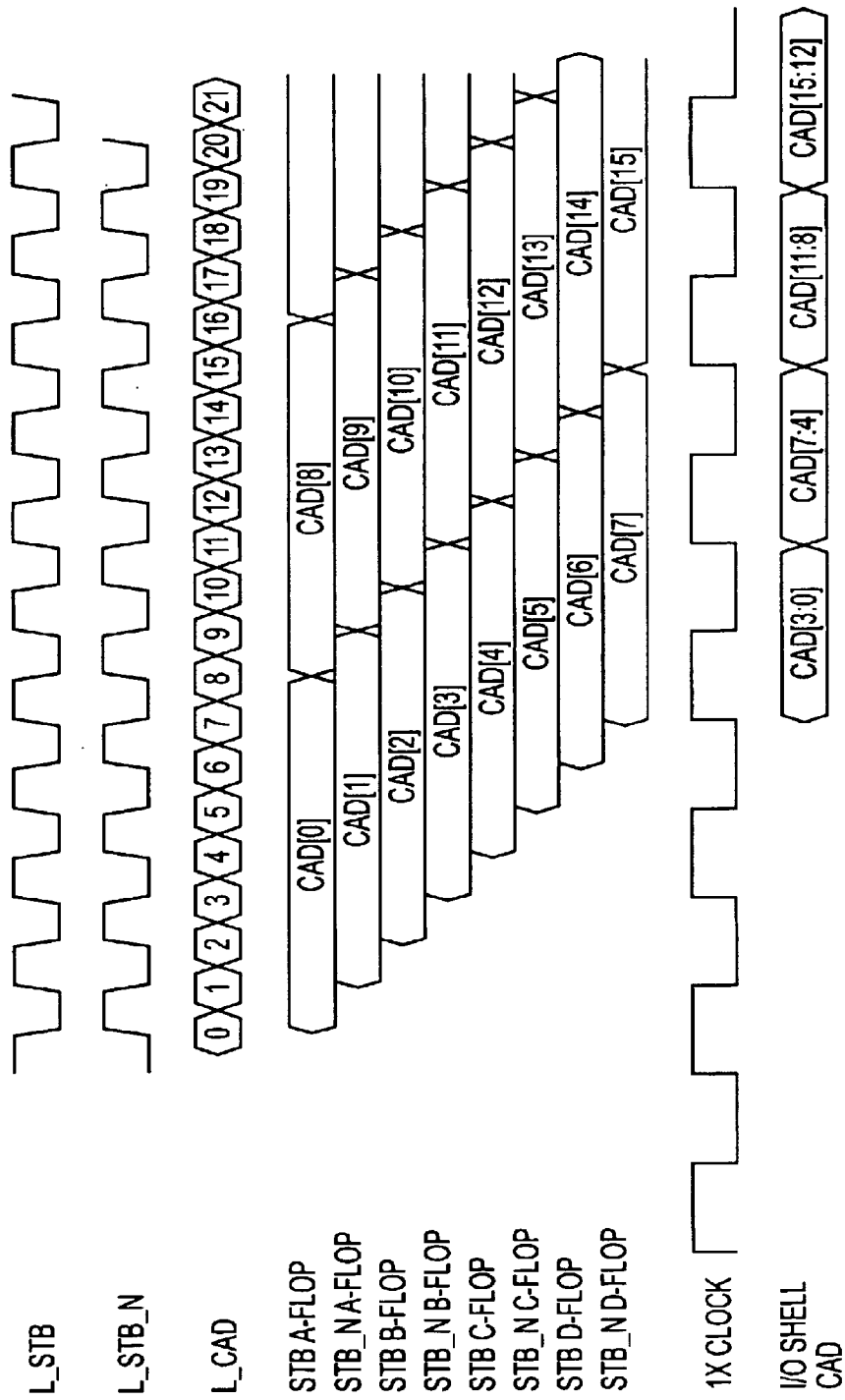

Once the signals are transmitted onto the link bus, another device may receive the signals in accordance with the link bus protocol. Referring now to FIG. 7, the timing of the receipt of the link bus command/address/data L_CAD and source strobed clock signals L_STB, L_STB_N is now described. The target device will receive the L_CAD and strobes L_STB, L_STB_N after some delay. The received information should then be synchronized back into the 1× clock domain. For each strobe of the source strobed clock signals L_STB, L_STB_N there is an A, B, C and D latch or flip-flop in the target I/O macro. L_CAD information is clocked into each flip-flop as CAD information in a ping-pong fashion so that timing may be met. The CAD is then transmitted to the 1× clock domain in the I/O macro by assembling each of the data in the A, B, C, D flops into a wider data path in accordance with rules that will meet timing requirements between the strobe domain and the 1× clock domain. Once in the 1× clock domain, the CAD is available to the target's core logic. An example of the I/O macros and core logic that may be used by the invention is described in co-pending application Ser. No. 09/730,775, entitled "Method Of Detecting A Source Strobe Event Using Change Detection," which is hereby incorporated by reference in its entirety.

Figure 8:
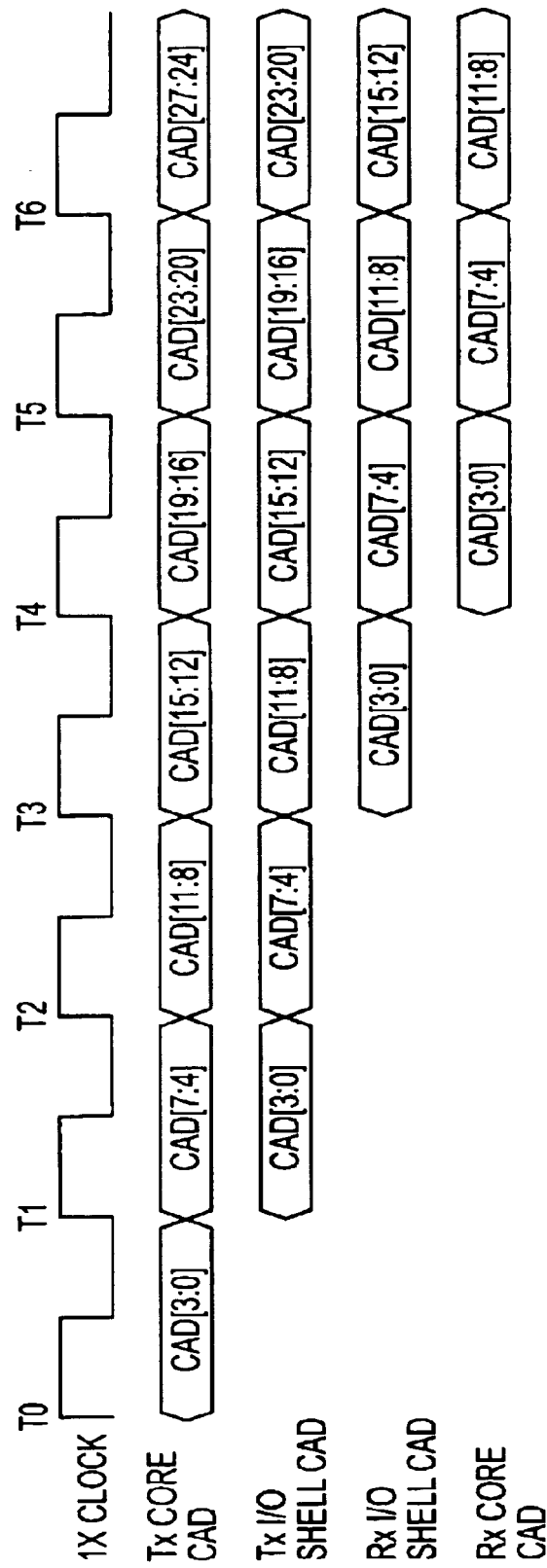

FIG. 8 shows a generalized view of the transfer of command/address/data from the time that it is available in the core logic of the transmitting device ("Tx"), to the time that it is available to the core logic of the receiving device ("Rx"). This generalized view does not show the intermediate steps of quad pumping across the link bus. For the purpose of illustration, it is assumed that CAD is quad pumped as illustrated in FIGS. 6 and 7. It should be noted that it takes five clock cycles from the time a state decision is made in the transmitter core (time T0), to the time the target core can act on that information (time T4). It should be appreciated that the above described timing diagrams are mere illustrations of exemplary embodiments of the link bus and link bus protocols and that the invention is not limited to any specific timing.

It is desirable for data to be paced only on certain naturally aligned data boundaries (ADB's). An ADB is an amount of data that may be transferred across the link bus in a certain number of clock cycles. In one embodiment, the ADB is the amount of data that may be transferred across the link bus in eight clock cycles. Examples of ADBs would include 64-bytes for a 16-bit link bus and 32-bytes for an 8-bit link bus. The pacing of information on the link bus is now described in more detail with reference to FIGS. 9–15.

Figure 9:
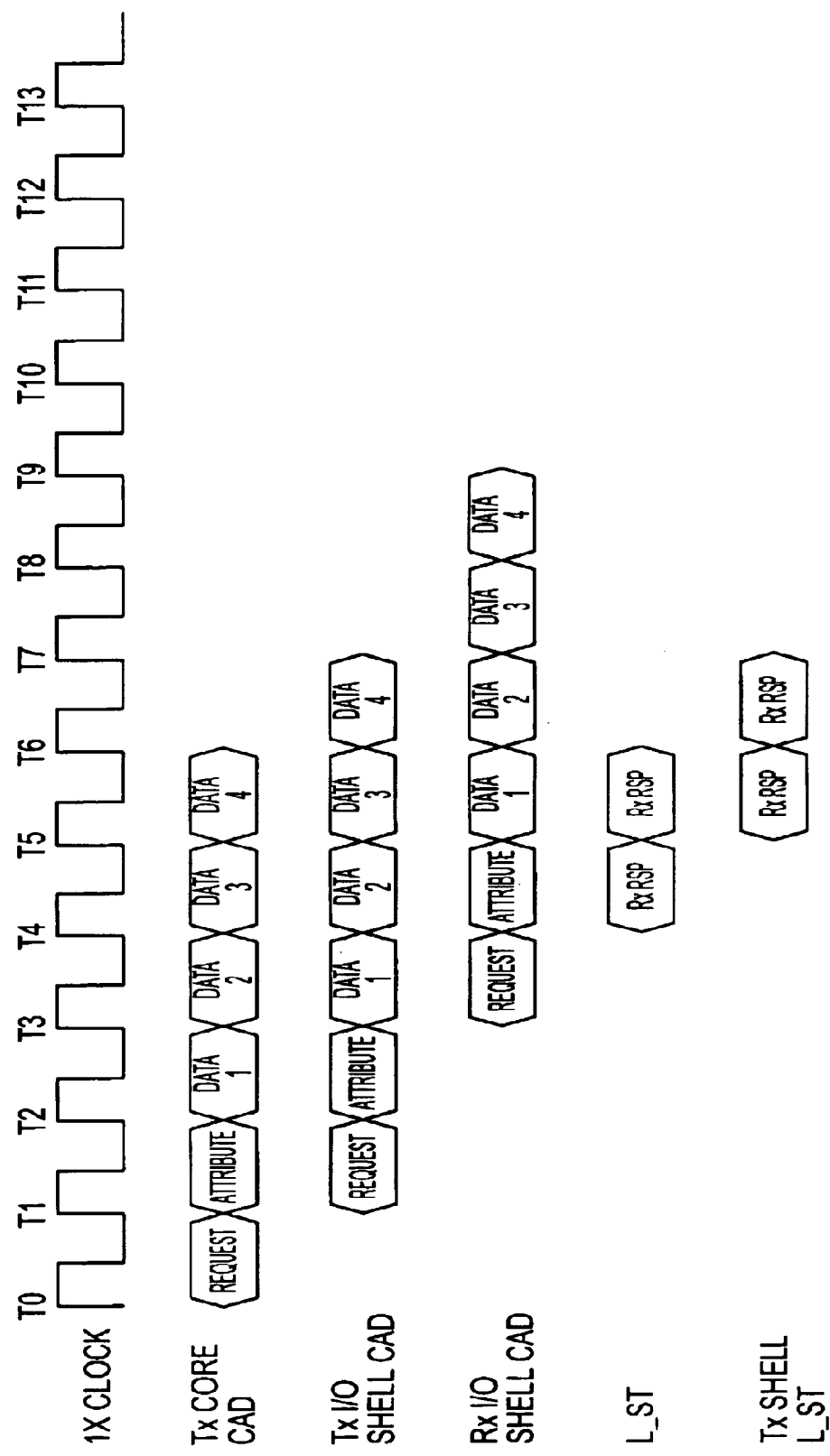
FIGS. 9–15 are timing diagrams illustrating the exemplary timing of transfer pacing and disconnecting performed in accordance with the invention.

As noted above, a link bus target may accept or retry an initial request by time multiplexing a response on the link bus status line L_ST. It should be noted that the designation "Tx" in FIGS. 9–15 refers to the transferor or transmitting device. The designation "Rx" in FIGS. 9–15 refers to the target or receiving device of a transfer. Referring to FIG. 9, the link bus transferor issues a request from its core logic at T0. This information becomes available for processing at the link bus target at T4, at which time the target may issue a response to the request. The transferor captures the response in T5, and the status information on the link bus status line L_ST is available to the core logic of the transferor at T6. At T6 the transferor core logic will know whether the request is to be retried, or whether the target has accepted the request. Once the request has been accepted, the target must accept the request in its entirety, this request response phase is the only opportunity the target has to terminate/disconnect a transfer request (as described in FIGS. 2 and 3).

In FIG. 9, there are two phases to the request response. The first phase indicates whether a request has been accepted or rejected. If rejected, the second phase indicates why it has been rejected. TABLE II illustrates each of the possible responses delivered during the two-phase response sequence. In an exemplary embodiment of the invention, the responses listed in Table II correspond to the disconnecting status information used in the methods 100, 150 illustrated in FIGS. 2 and 3. According to the exemplary responses in Table II, if the first phase is high, then the master must terminate the transfer. Conversely, the transfer is always accepted by the target when the first phase is low. In an exemplary embodiment, if the first phase is low, then the second phase is treated by the transferor as a don't care condition and the transfer is accepted. If the first phase is high, the second phase indicates that the transfer was terminated either due to a master abort, or to a retry.

TABLE II

| L_ST Response Phase 1 | L_ST Response Phase 2 | Response Type | Description. |
|---|---|---|---|
| High | High | Master Abort | There is no link target capable of responding to the request. This could be because there is no device on the bus, or the device is in a power-down state and cannot respond. The master shall terminate the transaction, bit bucket writes, and return all 1's on reads. |
| High | Low | Retry | The target cannot accept the request at this time. The master must terminate the transfer and reissue it at a later time. |
| Low | High | Accept | The target accepts the current transaction. The master continues with the data transfer. |
| Low | Low | Reserved | Reserved. |

If the signal on the link bus status line L_ST is high for both clocks cycles of the response phase, then the target is unable to respond for some reason. The reason may be because there is no target physically connected to the link bus, or the target exists but is unable to respond due to some power-down condition. The transferor treats the current transfer in a manner analogous with a PCI master abort. All writes are bit bucketed, and all reads return logical "1" values. No error condition is generated, but status may be set in internal configuration space indicating that a master abort has occurred, if desired.

If the signal on the link bus status line L_ST is high for the first response phase and low for the second, then the target has retried the request (i.e., has issued retry disconnecting status information). The action of the transferor as a result of the retry response is dependent upon the bus architecture of the request initiator. However, as a general rule the request should be retried back to the initiating bus (PCI, PCI-X, or some processor buses). The transferor can also reissue the request in the core logic, if arbitration rules allow it, as soon as T6 (FIG. 9). The target may have issued the retry response because of a shortage of buffer storage or due to some sort of requirement of the bus architecture subordinate to the link bus. Once the request has been retried, the target shall not retain any state information of the original request, and all data phases shall be ignored.

When the signal on the link bus status line L_ST is low during the first response phase, the target has accepted the request (i.e., the target has driven disconnecting status information indicating an accept condition). After accepting the request, the target must accept all data phases necessary to complete the request. However, as noted earlier, the target does have the capability to pace the data transfer. The transferor shall ignore the second phase of the response sequence and the target shall not issue the reserved response sequence.

The transferor may have transferred up to four clock cycles worth of data on the link bus before it even knows if the target has accepted the transfer. As a consequence of this, the master must be prepared to store all four clock cycles worth of data in the event the target has retried the entire request.

As noted above with respect to FIGS. 4 and 5, both the transferor and target have the ability to pace the data transfer once it has begun by driving pacing information on the link bus status line L-ST. In an exemplary embodiment, data transfers are always paced along ADB boundaries, so the transferor and target must provide enough buffering for the minimum burst size of one ADB.

Figure 10:
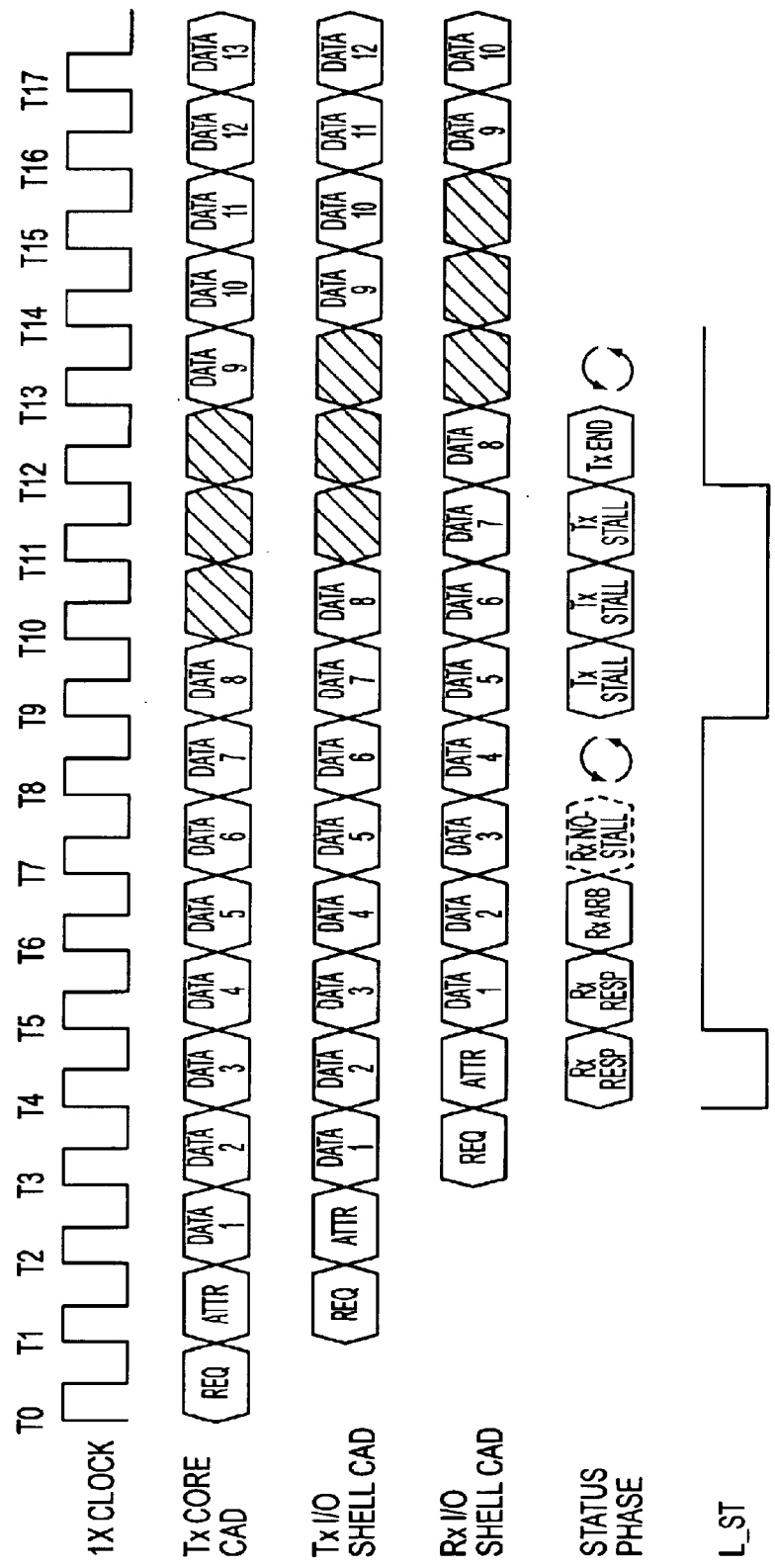

The transferor may pace a data transfer along ADB boundaries. Before issuing a burst request, the transferor must be capable of transferring a minimum burst size of one ADB, the subsequent data may then be paced at each ADB boundary (i.e., the ADB boundaries establish a window in which the transferor and target may pace the transfer). FIG. 10 is a continuation of FIG. 9 and illustrates a burst transfer that has been accepted by the target. The target will drive status information from the request from T4–T7, followed by a bus turn-around cycle at T8 (shown as two arrows in the status phase of FIG. 10). The transferor may signal its intention to stall the data transfer in T9. If the signal on the link status line L_ST is high during T9, the transferor must continue bursting the next ADB of data.

On the other hand, if L_ST is low during T9, the transferor has indicated to the target that data will be stalled (i.e., the transferor has driven pacing status information on the line L_ST). In addition, the data to be stalled must be treated as invalid. The transferor may continue stalling the data transfer for as many clock cycles as necessary. During a stall, the forwarded clock strobes are firing, but the data captured by the target is invalid. In an exemplary embodiment, the transferor indicates that the stall is over by driving L_ST high for one clock cycle in accordance with the link bus protocol. Having indicated the end of the stall, the transferor can not stall again until a minimum of one ADB has been transferred. In an exemplary embodiment, the transferor can only stall on ADB boundaries, so the transferor must be prepared for a complete one ADB transfer before releasing the stall.

The example burst transfer shown in FIG. 10 illustrates a transfer with three stall cycles by driving pacing status information (e.g., a low signal) on the link bus status line L_ST at T9–T11. The target observes the stall cycles in T10–12 and knows that data will be invalid during T14–T16. The transferor indicates the end of the stall by driving the signal on the link bus status line L_ST high in T12 and then tristating in T13. As will be shown later, the low to high transition on L_ST indicates to the target that it may drive status on L_ST.

Figure 11:
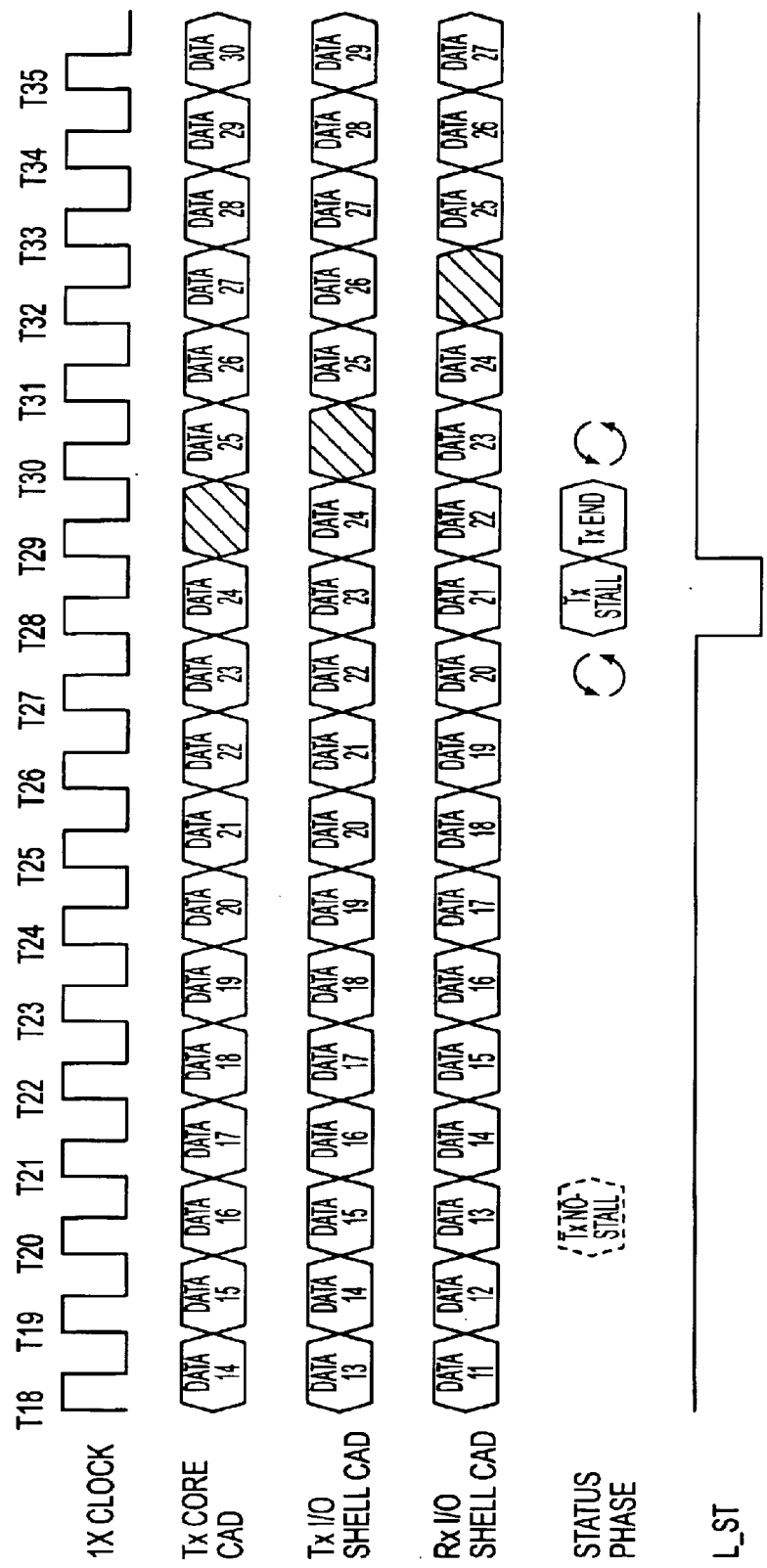

FIG. 11 is a continuation of FIG. 10 and is provided to illustrate exemplary subsequent data pacing by the link transferor. Because the transferor is only allowed to pace data along ADB boundaries, the target will next observe the state of L_ST at T21. In this example, the transferor did not stall the data transfer so L_ST is observed high by the target, which indicates that the next ADB of data is valid. At the next ADB boundary, however, the transferor indicates that data must be stalled briefly, so it drives pacing information on the line L_ST at T28, where it is observed by the target at T29. Upon detecting L_ST in a high state when sampled at T30, the target will resume the transfer in its pipeline.

In the preceding examples, it was seen that the transferor might choose to stall the transfer at the same time the last datum on an ADB is transferred from the core logic to the I/O shell. Because of the split-transaction nature of the link bus, the previous examples may actually be read data being returned to a split-transaction initiator. In particular, the previous examples may actually be read data from a memory controller. Because memory transactions are where performance gains are made, the transferor data stall decision point was intentionally set so that the transferor can wait to the last moment to decide if data is available. While at the same time, the target is allowed more than ample time to process the stall in its internal state machine. By placing the decision point as late as possible in the transferor, memory read latency is minimized.

As noted above, the target may also pace a data transfer along ADB boundaries. Before accepting a request, the target must be capable of transferring a minimum of one ADB, subsequent data may then be paced every ADB boundary.

Figure 12:
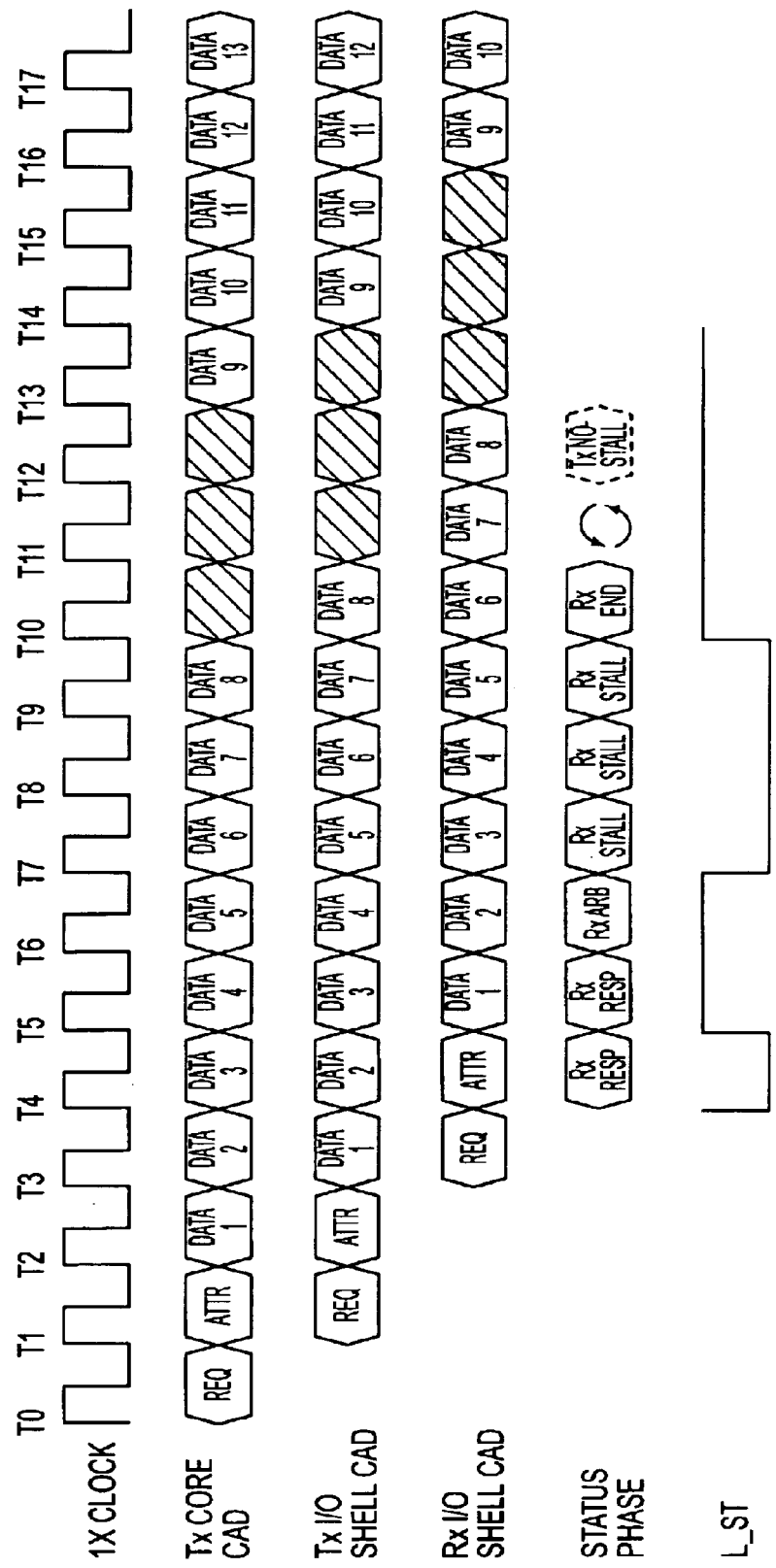

FIG. 12 illustrates a burst transfer in which the target must stall the data. The target drives pacing status information on the link bus status line (e.g., L_ST is driven low) starting at T7, where it is observed by the transferor in T8. The transferor is given ample time to process this information through it's state machines to indicate the data will be stalled beginning in T10. In this example, the target has stalled the data transfer for three clocks, consequently data is in an invalid state when sampled at T10–T13.

The target has the option of stalling a data transfer along ADB boundaries. Once the target drives L_ST high in T10, however, it does not have the opportunity to stall data again until the next ADB (i.e., the next window of opportunity to drive pacing information on the link bus). Consequently, the target must be capable of accepting a minimum of one ADB before driving L_ST high. Once driven high, the target must tristate L_ST in T11 to free up a slot on L_ST where the transferor may or may not stall the data transfer when L_ST is sampled at T13.

Figure 13:
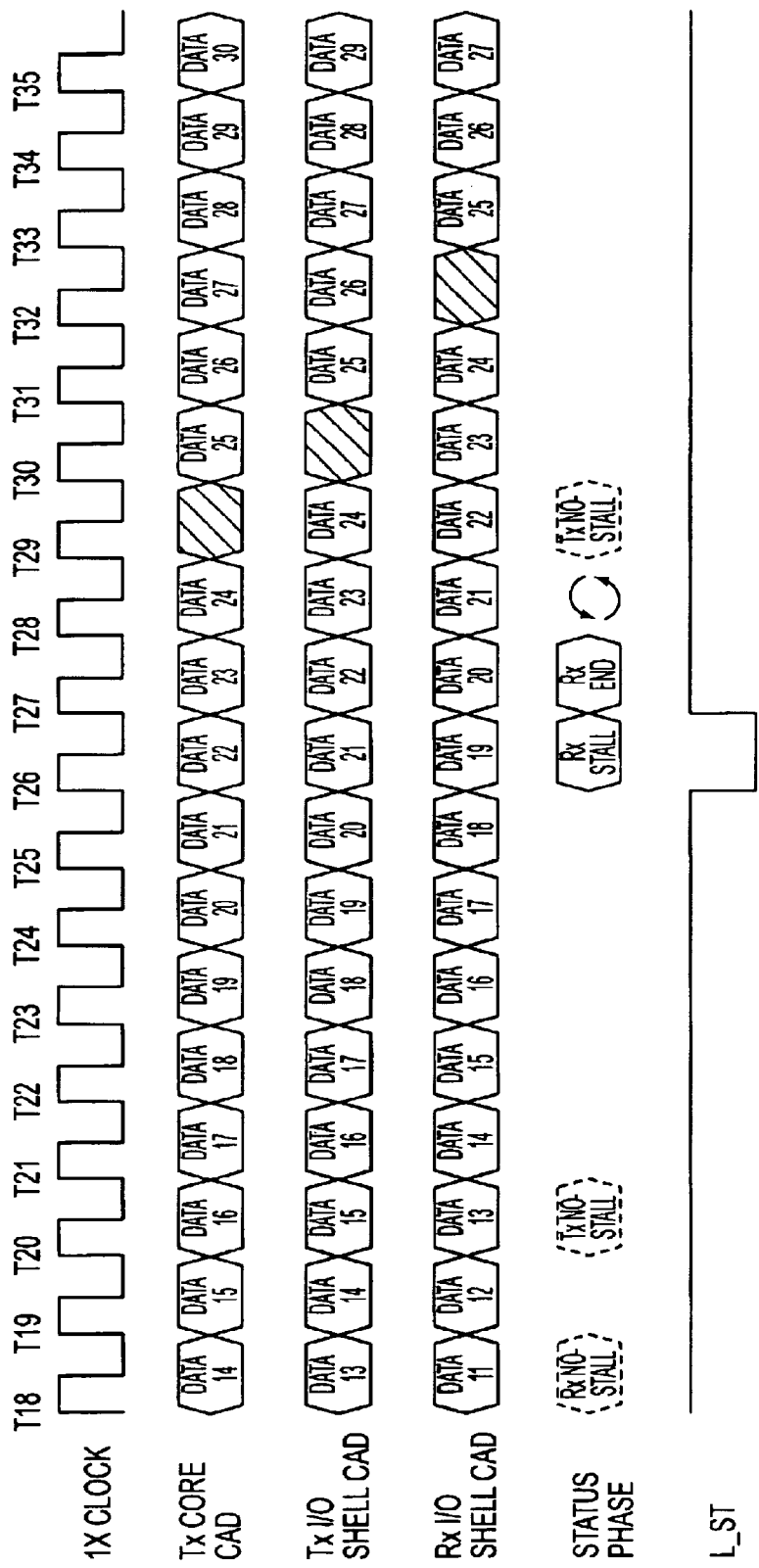

FIG. 13 is a continuation of FIG. 12 and is used to illustrate exemplary subsequent data pacing by the target.

Because the target is only allowed to pace data along ADB boundaries, the transferor will observe the state of the link bus status line L_ST at T19. In this example, the target did not stall the data transfer so L_ST is observed high by the transferor indicating that the next ADB of data is valid. The transferor has an opportunity to stall the transfer at T20, but does not do so. The target must observe the state of L_ST at T21 to determine if the transferor intends to stall the transfer. At the next ADB boundary, the target indicates that data must be stalled, so it drives L_ST low at T26, where it is observed by the master at T27. Upon detecting L_ST in a high state when sampled at T28, the transferor will resume the transfer in its pipeline if it does not require a stall as well. In this example, the transferor does not stall the transfer, as L_ST is observed high at T30.

In the preceding examples, it was seen that the target must choose relatively early in the transfer to stall the data. Because of the split-transaction nature of the link bus, data is always being pushed, never pulled. If the target needs to stall a data transfer, it means that there is no place to put the data in its local buffers. If the buffers are nearly full, it means that there is a bottleneck somewhere further down the pipeline that is preventing the target from clearing it's buffers. Since the bottleneck lies elsewhere in the pipe, and not in the target itself, making the target reach a decision point early in the transfer is not seen as an impact on performance. It is better to allow the transferor to reach a decision point late in the transfer where read latencies may be reduced and relegate the target decision point early in the transfer where performance is unaffected. In general, the target should be configured with enough buffering resources such that it rarely stalls data transfers. However, due to bandwidth imbalances between buses, some target data stalls are inevitable.

Figure 14:
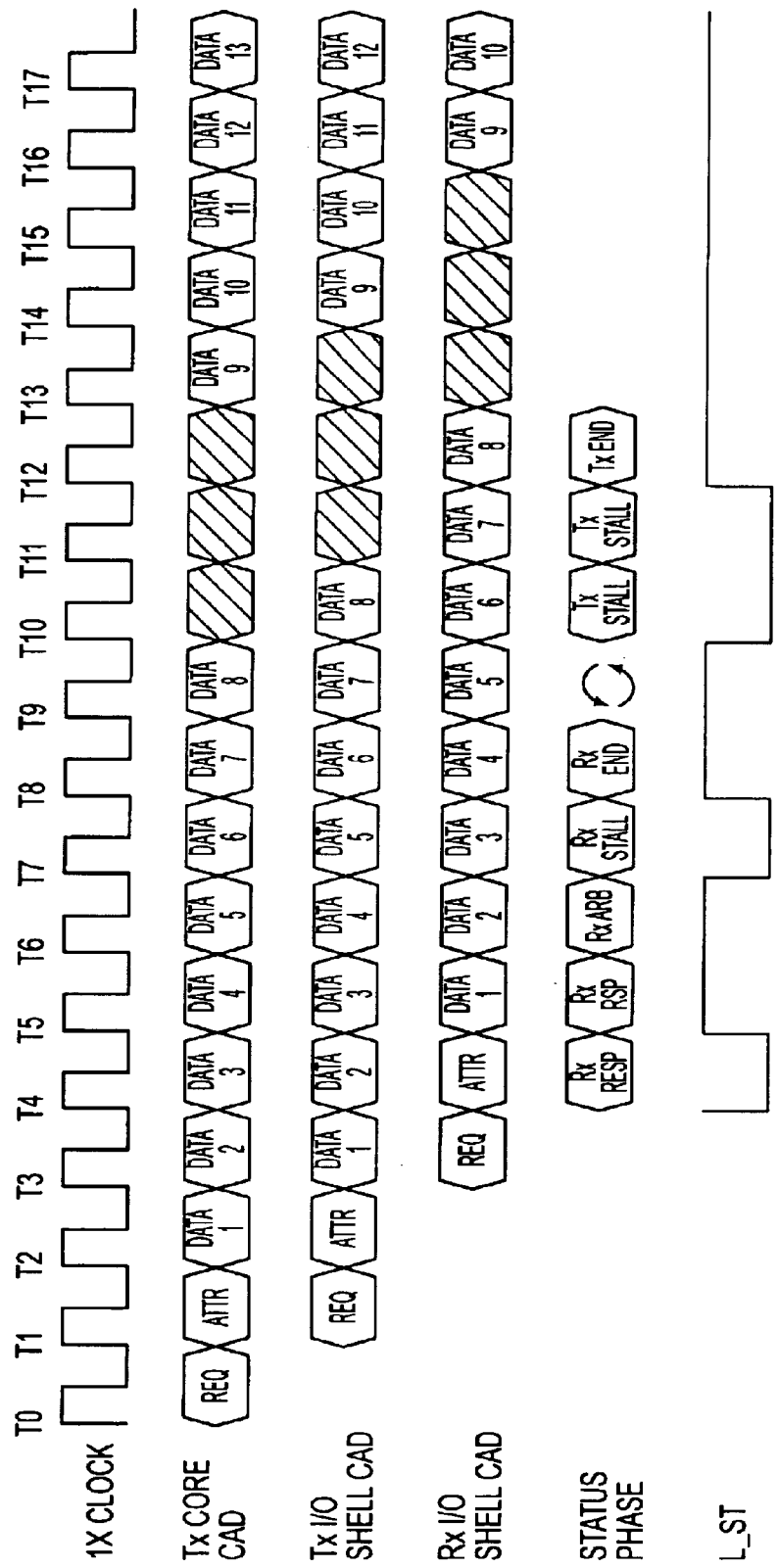
Figure 15:
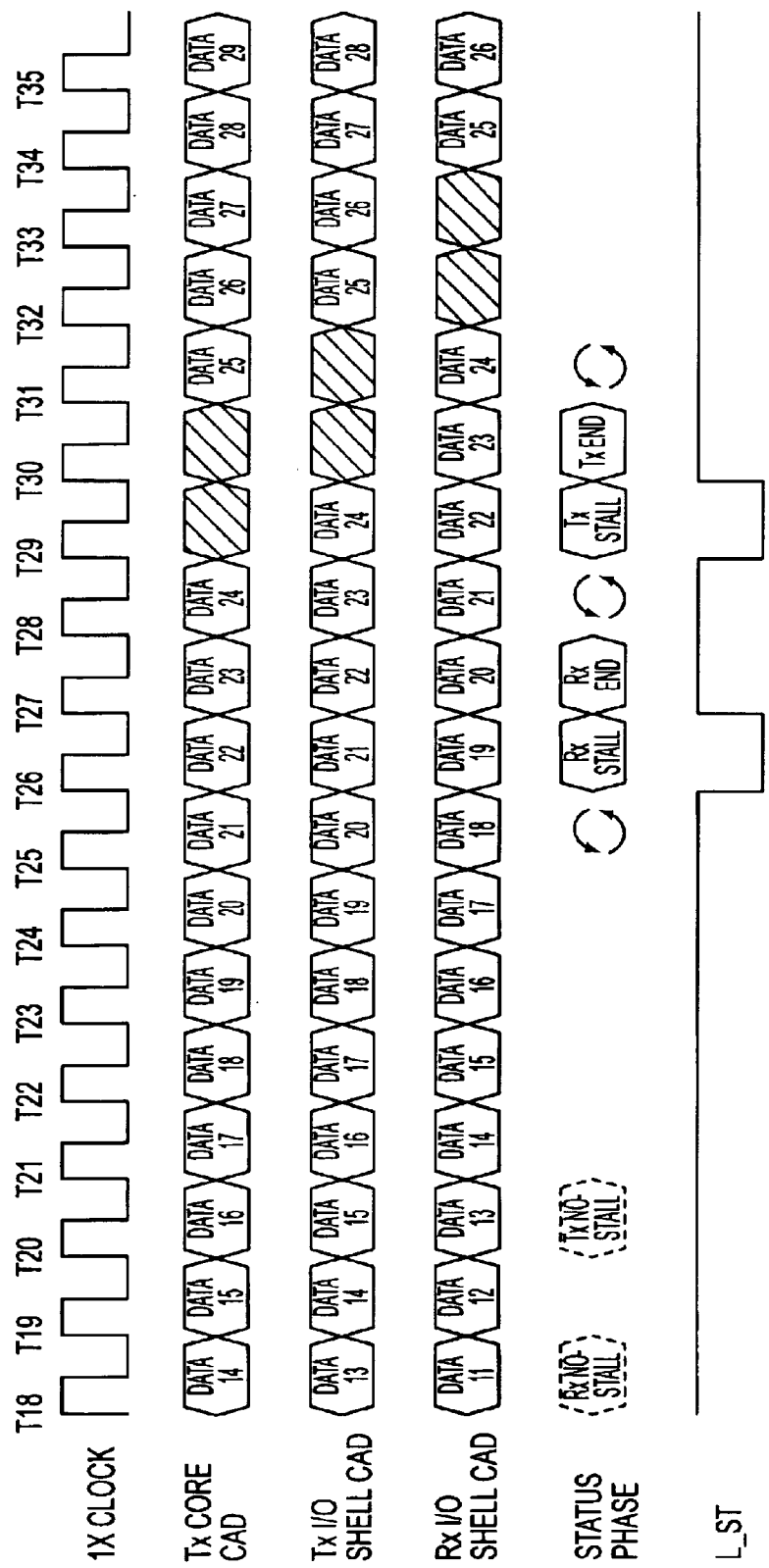

As described above, either the transferor or the target may stall data along ADB boundaries on the link bus. The link bus protocol allows both devices to stall the data transfer along the same ADB boundary if desired. FIGS. 14 and 15 illustrate a burst transfer that must be stalled by both the transferor and the target for independent reasons. In this example, the target must briefly stall the data transfer and indicates this by driving L_ST low at T7, where the transferor observes this at T8. After observing the low to high transition of L_ST in T8 and T9, the transferor may initiate a stall of its own at T10. This allows the transferor to control the length of the stall.

The link bus status line L_ST may also be used to time multiplex arbitration information. For every transaction, one device connected to the link bus will serve as a bus master and the other device will serve as the bus slave. As noted above, data may be stalled by either the master (typically the transferor) or the slave (typically the target) by defining certain windows during a transfer in which the status may be driven and observed. In a typical situation, the transferring device serves as the master, while the receiving device (i.e., the target) serves as the slave. The target may request its desire to become the link master by time multiplexing an arbitration request on the status signal L_ST.

Each device connected to a particular the link bus is given the opportunity to arbitrate for the link bus. Typically, when a source strobed bus is used, one device (e.g., memory controller) always serves as the bus master, while the other device (e.g., memory device) always serves as the bus slave. In the present invention, however, either device can serve as the master. In one exemplary embodiment of the invention, the link bus follows a round-robin arbitration method. Due to the split-transaction nature of the link bus, both devices must have a fair opportunity to access the link bus to prevent deadlocks. There is no central arbitration point which decides who is granted the bus. Instead, the arbitration is decentralized with each device observing certain state information to decide which of the devices is the bus master. A device that is not currently the bus master (i.e., the target) may request to become a bus master by time multiplexing an arbitration request on the link status signal L_ST. The arbitration protocol allows bus parking, and back-to-back transfers to minimize latencies and improve performance. The arbitration of the bus is distributed between the two Link entities, as is described in co-pending application Ser. No. 09/730,780, entitled "Arbitration Method for a Source Strobed Bus," which is hereby incorporated by reference in its entirety.

Now that the basic functions and timing of an exemplary link bus and link bus protocol have been described, the following now describes the format and content of the information packets transmitted over the link bus. One packet of information is the command packet. A command packet is issued by the current link bus master and may include information such as command, address, transfer count, as well as other attributes needed in the system. An exemplary command packet format is illustrated below in Table III. It should be noted that the formatting illustrated in Table III (and Tables IV–X) are examples of the type of format/content that may be used to implement the link bus and link bus protocol. Specific bit fields or sizes of the fields are not given in the Tables because the invention is not limited to any specific field size or position (i.e., bit position) within the packet.

TABLE III

| Field | Description |
| --- | --- |
| Command | Bus Command |
| Address | During memory transactions this field represents a portion of the address. |
| Count/Enable | During block transfers, this field represents the number bytes to transfer. During partial transfers this field represents byte enables. |
| Command attribute | The command attribute field is defined differently for split completion commands and all other commands. For split completion commands this field indicates the completion status of an earlier requested transfer. For all other commands the field indicates transfer attributes of the current request. |

As can be seen from Table III, an exemplary command packet may include command, address, transfer count or byte enable and attribute fields. Exemplary commands that can occupy the command field are illustrated below in Table IV. In an exemplary embodiment, the link bus supports split transactions. Thus, the command attribute field is defined differently for split completion commands than all other command requests. Table V illustrates exemplary definitions for the attribute field for all normal commands, while Table VI illustrates exemplary definitions for the attribute field for the split completion command.

TABLE IV

| Command | Description |
| --- | --- |
| Idle | Bus Idle, no requests. All other bits are inactive to conserve power. |
| Split Completion | Split completion reply. Issued in response to a previously issued request to transfer read data, |

TABLE IV-continued

| Command | Description |
| --- | --- |
|  | or transfer completion status. |
| Message Read | Message read request such as processor interrupt acknowledge, flush, fence. |
| Message Write | Message write request such as processor special cycles, NOP, interrupt messaging, and error status messaging. |
| Block Memory Read | Request a memory read of e.g., 1 to 4K bytes. Large block memory reads are the preferred transfer method. |
| Block Memory Write | Request a memory write of e.g., 1 to 4K bytes. Byte enables for all requested bytes are assumed active. Large block memory writes are the preferred transfer method |
| Partial Memory Read | Request a memory read of bytes less than the minimum burst size read. |
| Partial Memory Write | Request a memory write of bytes less than the minimum burst size write. |
| Configuration Read | Read Configuration data. Address is encoded similar to PCI Type 1 configuration cycles. The Link target must decode to determine if transfer is target internally or to subordinate bus. |
| Configuration Write | Write Configuration data. Address is encoded similar to PCI Type 1 configuration cycles. The Link target must decode to determine if transfer is target internally or to subordinate bus. |
| I/O Read | I/O read data. |
| I/O Write | I/O write data. |
| Reserved | Reserved Commands. |

TABLE V

| Field | Description |
| --- | --- |
| Relaxed Ordering Rules | Indicates that the target may use relaxed ordering rules to transfer data. |
| No Snoop | Indicates that memory accesses do not need to be snooped. Not valid for non-memory transfers. |
| No Split-Completion | Indicates that no split-completion message is expected by the master. For writes, this indicates that the transfer is posted, and the master assumes the target shall perform the steps necessary to complete it on the subordinate bus. |
| Lock | Indicates the status of bus lock issued by the processor. Only valid during processor initiated transfers. Note this does not lock the link bus, only the target bus subordinate to the link bus. |

TABLE VI

| Field | Description |
| --- | --- |
| Retry | Indicates that the target has retried the transaction. |
| Request Complete | Indicates that the read/write request has completed normally. |
| RD/WR | Indicates that the split completion is issued in response to a read or write request. |
| No Data | Indicates that no data is transferred, and the value of the Count/Enable field is invalid. |
| Split Completion Error | Indicates that an error occurred during the split completion. |
| Split Completion Error Status | Indicates the type of completion error as defined in e.g., PCI-X. |

The address field identifies the address of the target request. The address field is slightly different for each of the commands. Table VII illustrates one way in which the address field may vary dependent upon the command field.

TABLE VII

| Command | Address Field Description |
| --- | --- |
| Idle | All address bits in the low power state. |
| Split Completion. | Copy of the original split-transaction tag issued with the original request. All other bits are reserved. |
| Message Read | See Table VIII |
| Message Write | See Table IX |
| Block Memory Read Block Memory Write | Address of the memory request. |
| Partial Memory Read Partial Memory Write | Address of the memory request. |
| Configuration Read Configuration Write | Address of Configuration address register (e.g., I/O register). |
| I/O Read I/O Write | Address of the I/O request. |
| Reserved | Reserved. Should be driven to the low power state. |

The address field requires a more detailed definition for message read and write commands. Exemplary address fields for write commands are found in Table VIII, while exemplary address fields for read commands are found in table IX.

TABLE VIII

| Command | Description |
| --- | --- |
| Shutdown Special Cycle | Processor special cycle |
| Halt Special Cycle | Processor special cycle |
| Stop Clock Grant Special Cycle | Processor special cycle |
| x86 architecture specific | Processor special cycle |
| NOP | No Operation. May be issued from any link device. |
| Interrupt Event | One or more interrupt lines from a satellite have changed states. |
| PERR Event | Change in PERR status. |
| SERR Event | Change in SERR status. |

TABLE IX

| Command | Description |
| --- | --- |
| Interrupt Acknowledge | Processor interrupt acknowledge |
| Flush | Flush buffers |
| Fence | Fence buffers |

In an exemplary embodiment, a split-transaction tag is used to identify the source of a request so that it may be later replied to with a split completion request. The tag is defined to interface with similar tags used for various processors and is described in Table X.

TABLE X

| Field | Description |
| --- | --- |
| Agent Type | Identifies the Agent as a processor, link bus satellite, or link hub. |
| Agent Tag | Identifies a particular request of the initiating Agent. This field is large enough to carry information from the processor cluster, or a PCI-X agent |
| Agent Bus Number | The PCI Bus number of the requesting device |
| Agent Device Number | The PCI device number of the requesting device |
| Agent Function number | The PCI function number of the requesting device |

Now that the exemplary format/content of command packets have been described, the following now describes an exemplary set of rules required to adhere to the link bus protocol. As much of the control information is time multiplexed across the status signal L_ST, there are certain rules that must be observed by the link master and slave to determine when information is valid and when the information can be driven on the link bus. When a device drives the status signal L_ST low, it will always drive it high one clock before tri-stating the signal L_ST.

Another rule governs the response of the target device. For example, a response must be issued by the target one clock cycle after observing the transfer request in the clock domain. The response must be observed by the master four clocks cycles after issuing the transfer request in the clock domain. Otherwise the response will be deemed invalid. In addition, the transfer shall be terminated by the master one clock after observing a response retry signal. It should be noted that the link bus protocol requires other rules governing the arbitration process, but they are not described herein because they are described in the co-pending applications previously identified above.

As noted earlier, the present invention capitalizes on the link bus and the link bus protocol to allow satellite devices and the link hub to disconnect and pace data transfers on the link bus with the use of a single status line. The invention allows transferring, retrying, aborting, or stalling data transfers in an efficient and timely manner, which prevents deadlocks, bottlenecks, etc. and improves the performance of the system utilizing the link bus. The transferring, retrying, aborting, and stalling operations are performed based on time-multiplexed transfer pacing and disconnecting status information that is transmitted in accordance with the link bus protocol.

It should be noted that the formats, timings and other definitions describing the link bus and the link bus protocol are mere examples. The invention is not to be limited to the specific examples described herein.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. A method of transferring data in a processor based system, the system comprising a link bus, said link bus comprising a hub device and a plurality of link bus segments each comprising a plurality of lines for communicating commands, addresses, and data, and a status line, each link bus segment being coupled to said hub device and one respective satellite device of said link bus to form a point-to-point link between said hub and respective satellite device, one of said respective satellite device being a first device, a processor coupled to said hub device via by a processor bus a memory device coupled to said hub device via a memory bus, said method comprising the steps of:

issuing, from one of the first device and the hub device, a data transfer request on the link bus;

obtaining a status of the request by observing the status line of said link bus during a first predetermined window of time;

determining from the obtained request status whether a data transfer corresponding to the request should be initiated;

initiating the data transfer by transferring data on the link bus if it is determined from the observed request status that the data transfer should be initiated;

obtaining a status of the initiated transfer by observing the status line of said link bus during a second predetermined window of time; and determining from the obtained transfer status whether the initiated data transfer should be stalled.

2. The method of claim 1, wherein the data transfer request is a command packet message constructed in accordance with a protocol of the link bus.

3. The method of claim 2 further comprising the step of driving, from an intended target of the transfer, the request status onto the status line based on information contained in the command packet message.

4. The method of claim 3, wherein the information within the command packet comprises at least a size of the data transfer.

5. The method of claim 3, wherein the information within the command packet comprises at least a size and type of the data transfer.

6. The method of claim 3, wherein the information within the command packet comprises at least a size, attribute, and type of the data transfer.

7. The method of claim 1 further comprising the step of determining whether the transfer should be retried at a subsequent time if it is determined from the observed request status that the data transfer should not be initiated.

8. The method of claim 7 further comprising rescheduling the transfer if is determined from the observed request status that the transfer should be retried.

9. The method of claim 8 further comprising the step of driving, from an intended target of the transfer, the request status onto the status line based on information contained in the transfer request.

10. The method of claim 7 further comprising the step of determining whether the transfer should be aborted if it is determined from the observed request status that the data transfer should not be initiated and should not be retried.

11. The method of claim 10 further comprising the step of aborting the transfer if it is determined from the observed request status that the transfer should be aborted.

12. The method of claim 11, wherein said aborting step comprises:

bit bucketing write operations on the issuing device; and returning a predetermined logical value for all read operations on the issuing device.

13. The method of claim 10, wherein the request status is driven onto the status line by a pull-up device connected to the status line.

14. The method of claim 1 further comprising the act of initiating a data transfer stall if it is determined from the observed transfer status that the data transfer should be stalled.

15. The method of claim 14, wherein said step of initiating a data stall comprises:

determining if the initiated transfer is on an allowable data boundary; and stopping the transfer if it is determined that the transfer is on an allowable data boundary.

16. The method of claim 14 further comprising the step of driving, from a target of the initiated transfer, the transfer status onto the status line when the target must stall the transfer.

17. The method of claim 14 further comprising:

obtaining a status of the stalled transfer by observing the status line during a third predetermined window of time;

determining from the obtained stalled transfer status whether the stalled data transfer should be continued; and continuing the data transfer if it is determined from the observed stalled transfer status that the data transfer should be continued.

18. A method of transferring data in a processor based system, the system comprising a link bus, said link bus comprising a hub device and a plurality of link bus segments each comprising a plurality of lines for communicating commands, addresses, and data, and a status line, each link bus segment being coupled to said hub device and one respective satellite device of said link bus to form a point-to-point link directly connecting said hub and respective satellite device, one of said respective satellite devices being a first device, a processor coupled to said hub device via a processor bus a memory device coupled to said hub device via a memory bus, said method comprising the steps of:

issuing, from one of the first device and the hub device, a data transfer request on the link bus;

obtaining a status of the request by observing the status line of said link bus during a first predetermined window of time;

determining from the obtained request status whether a data transfer corresponding to the request should be initiated;

initiating the data transfer by transferring data on the link bus if it is determined from the observed request status that the data transfer should be initiated;

determining if the initiated transfer should be stalled; and if it is determined that the initiated transfer should be stalled, driving a stalled status indication on the status line of said link bus during a second predetermined window of time and stalling the transfer.

19. The method of claim 18, wherein said step of initiating a data stall comprises:

determining if the initiated transfer is on an allowable data boundary; and stopping the transfer if it is determined that the transfer is on an allowable data boundary.

20. A method of receiving data in a processor based system, the system comprising a link bus, said link bus comprising a hub device and a plurality of link bus segments each comprising a plurality of lines for communicating commands, addresses, and data, and a status line, each link bus segment being coupled to said hub device and one respective device of said link bus to form a point-to-point link directly connecting said hub and respective satellite device, one of said respective satellite devices being a first device, a processor coupled to said hub device via a processor bus and a memory device coupled to said hub device via a memory bus, said method comprising the steps of:

detecting, at one of the first device and the hub device, a data transfer request on the link bus;

determining a status of a data transfer associated with the transfer request based on the transfer request;

driving the status on the status line of said link bus during a first predetermined window of time, wherein the status is selected from the group consisting of an accept status indicating that the transfer can be initiated and a retry status indicating that the transfer should be retried at a subsequent period of time;

obtaining a status of an initiated transfer of data over said link bus by observing the status line of said link bus during a second predetermined window of time; and determining from the obtained transfer status whether the initiated data transfer should be stalled.

21. The method of claim 20, wherein the data transfer request is a command packet message constructed in accordance with a protocol of the link bus.

22. The method of claim 21, wherein the information within the command packet comprises at least a size of the data transfer and said step of determining the status of the transfer comprises:

determining whether the transfer can be accepted based on the size of the transfer;

driving the status line with the accept status if it is determined that the transfer can be accepted; and driving the status line with the retry status if it is determined that the transfer cannot be accepted.

23. The method of claim 21, wherein the information within the command packet comprises at least a size and type of the data transfer and said step of determining the status of the transfer comprises:

determining whether the transfer can be accepted based on the size and type of the data transfer;

driving the status line with the accept status if it is determined that the transfer can be accepted; and driving the status line with the retry status if it is determined that the transfer cannot be accepted.

24. The method of claim 21, wherein the information within the command packet comprises at least a size, attribute, and type of the data transfer and said step of determining the status of the transfer comprises:

determining whether the data transfer can be accepted based on the size, attribute and type of the transfer;

driving the status line with the accept status if it is determined that the transfer can be accepted; and driving the status line with the retry status if it is determined that the transfer cannot be accepted.

25. The method of claim 20 further comprising the act of initiating a data transfer stall if it is determined from the observed transfer status that the data transfer should be stalled.

26. The method of claim 25, wherein said step of initiating a data stall comprises ignoring any data transferred on the link bus.

27. The method of claim 25 further comprising:

obtaining a status of the stalled transfer by observing the status line during a third predetermined window of time;

determining from the obtained stalled transfer status whether the stalled data transfer should be continued; and continuing the data transfer if it is determined from the observed stalled transfer status that the data transfer should be continued.

28. The method of claim 25 further comprising the step of driving, from a target of the initiated transfer, a target stall status onto the status line when the target must stall the transfer.

29. The method of claim 28 further comprising:

driving, from the target, another target stall status onto the status line when the target determines that the data transfer should be continued.

30. A method of transferring data in a processor based system, the system comprising a link bus, said link bus comprising a hub device and a plurality of link segments, each comprising a plurality of lines for communicating commands, addresses, and data, and a status line, each link bus segment being coupled to said hub device and one respective device of said link bus to form a point-to-point link directly connecting said hub and respective satellite device, one of said respective satellite devices being a first device, a processor coupled to said hub device via a processor bus and a memory device coupled to said hub device via a memory bus, said method comprising the steps of:

issuing, from one of the first device and the hub device, a data transfer request on the link bus;

detecting, at the other one of the first device and the hub device, the data transfer request on the link bus;

determining a status of a data transfer associated with the transfer request based on the detected transfer request;

driving the status of the data transfer on the status line of said link bus during a first predetermined window of time;

obtaining the status of the transfer by observing the status line of said link bus during the first predetermined window of time;

determining from the obtained status whether the data transfer corresponding to the request should be initiated;

initiating the data transfer by transferring data on the link bus if it is determined from the observed status that the data transfer should be initiated;

determining if the initiated transfer should be stalled; and if it is determined that the initiated transfer should be stalled, driving a stalled status indication on the status line of said link bus during a second predetermined window of time and stalling the transfer.

31. The method of claim 30 further comprising the step of determining whether the transfer should be retried at a subsequent time if it is determined from the observed status that the data transfer should not be initiated.

32. The method of claim 31 further comprising rescheduling the transfer if is determined from the observed status that the transfer should be retried.

33. The method of claim 31 further comprising the step of determining whether the transfer should be aborted if it is determined from the observed status that the data transfer should not be initiated and should not be retried.

34. The method of claim 33 further comprising the step of aborting the transfer if it is determined from the observed status that the transfer should be aborted.

35. The method of claim 34, wherein said aborting step comprises:

bit bucketing write operations on the issuing device; and returning a predetermined logical value for all read operations on the issuing device.

36. The method of claim 34, wherein the status is driven onto the status line by a pull-up device connected to the status line.

37. A processor system comprising:

a processor; and a link bus, said link bus comprising, a link hub, said link hub being connected to said processor via a processor bus; and a plurality of link bus segments, each comprising a first bus for communicating commands, addresses, and data, and a status line, each link bus segment being coupled to said hub device and one device of said link bus to form a point-to-point link directly connecting said hub and respective link bus device one of said respective link bus devices being a satellite device;

wherein one of said link hub and said satellite device is a bus master and the other of said link hub and satellite device is a target, said master issues a data transfer request on said first bus, obtains a status of the request by observing said status line of said link bus during a first predetermined window of time, determines from the obtained request status whether a data transfer corresponding to the request should be initiated, initiates the data transfer by transferring data over said first bus when the data transfer should be initiated, obtains a status of the initiated transfer by observing said status line of said link bus during a second predetermined window of time, and determines from the obtained transfer status whether the initiated data transfer should be stalled.

38. The system of claim 37, wherein the data transfer request is a command packet message constructed in accordance with a protocol of said link bus.

39. The system of claim 38, wherein said command packet comprises at least a size of the data transfer.

40. The system of claim 38, wherein said command packet comprises at least a size and type of the data transfer.

41. The system of claim 38, wherein said command packet comprises at least a size, attribute, and type of the data transfer.

42. The system of claim 37, wherein said master determines whether the transfer should be retried at a subsequent time when it is determined from the observed request status that the data transfer should not be initiated.

43. The system of claim 42, wherein said master reschedules the transfer when the transfer should be retried.

44. The system of claim 42, wherein said master determines whether the transfer should be aborted when it is determined from the observed request status that the data transfer should not be initiated and should not be retried.

45. The system of claim 44 wherein said master aborts the transfer when the transfer should be aborted.

46. The system of claim 44, wherein said master performs bit bucketing of write operations and returns a predetermined logical value for all read operations when the transfer should be aborted.

47. The system of claim 42, wherein said status line is coupled to a pull-up device and the request status is driven onto said status line by said pull-up device.

48. The system of claim 37, wherein said master initiates a data transfer stall when the data transfer should be stalled.

49. The system of claim 48, wherein said master initiates a data stall by determining if the initiated transfer is on an allowable data boundary and stopping the transfer when the transfer is on an allowable data boundary.

50. The system of claim 48, wherein said target drives the transfer status onto said status line when said target must stall the transfer.

51. The system of claim 48, wherein said master obtains a status of the stalled transfer by observing said status line during a third predetermined window of time, determines from the obtained stalled transfer status whether the stalled data transfer should be continued, and continues the data transfer when the data transfer should be continued.

52. The system of claim 37, wherein when said master determines if the initiated transfer should be stalled, said master drives a stalled status indication on the status line during the second predetermined window of time and stalls the transfer.

53. The system of claim 52, wherein said master initiates the data stall by determining if the initiated transfer is on an allowable data boundary and stopping the transfer when the transfer is on an allowable data boundary.

54. The system of claim 37, wherein said link bus is a source strobed bus.

55. The system of claim 54, wherein said first bus is a command/address/data bus.

56. A processor system comprising:

a processor; and a link bus, said link bus comprising,
- a link hub connected to said processor via a processor bus; and
- a plurality of link bus segments, each comprising a first bus for communicating commands, addresses, and data, and a status line, each link bus segment being coupled to said hub device and one device of said link bus to form a point-to-point link directly connecting said hub and respective link bus device, one of said respective link bus devices being a satellite device;

wherein
- one of said link hub and said satellite device is a bus master and the other of said link hub and satellite device is a target,
- said target detects a data transfer request on said first bus,
- determines a status of a data transfer associated with the transfer request based on the transfer request, and
- drives the status on said status line of said link bus during a first predetermined window of time, wherein the status is selected from the group consisting of an accept status indicating that the transfer can be initiated and a retry status indicating that the transfer should be retried at a subsequent period of time, and wherein said target obtains a status of an initiated transfer of data over said link bus by observing said status line of said link bus during a second predetermined window of time, and determines from the obtained transfer status whether the initiated data transfer should be stalled.

57. The system of claim 56, wherein said link bus is a source strobed bus.

58. The system of claim 56, wherein said first bus is a command/address/data bus.

59. The system of claim 56, wherein the data transfer request is a command packet message constructed in accordance with a protocol of said link bus.

60. The system of claim 59, wherein said command packet comprises at least a size of the data transfer and said target determines the status of the transfer by determining whether the transfer can be accepted based on the size of the transfer, driving said status line with the accept status when the transfer can be accepted, and driving said status line with the retry status when the transfer cannot be accepted.

61. The system of claim 59, wherein said command packet comprises at least a size and type of the data transfer and said target determines the status of the transfer by determining whether the transfer can be accepted based on the size and type of the data transfer, driving said status line with the accept status when the transfer can be accepted, and driving said status line with the retry status when the transfer cannot be accepted.

62. The system of claim 56, wherein said target initiates a data transfer stall when the data transfer should be stalled.

63. The system of claim 62, wherein said target initiates the data stall by ignoring any data transferred on the first bus.

64. The system of claim 62, wherein said target obtains a status of the stalled transfer by observing said status line during a third predetermined window of time, determines from the obtained stalled transfer status whether the stalled data transfer should be continued, and continues the data transfer when the data transfer should be continued.

65. A processor system comprising:

a processor; and a link bus, said link bus comprising,
- a link hub connected to said processor via a processor bus; and
- a plurality of link bus segments, each comprising a first bus for communicating commands, addresses, and data, and a status line, each link bus segment being coupled to said hub device and one device of said link bus to form a point-to-point link directly connecting said hub and respective link bus device, one of said respective link bus devices being a satellite device;

wherein
- one of said link hub and said satellite device is a bus master and the other of said link hub and satellite device is a target; and
- said master and target being able to at least initiate, disconnect, retry, abort and stall data transfers on said first bus by time multiplexing disconnecting and pacing status information on said status line.

66. The system of claim 65, wherein said disconnecting information comprises an accept status indicating that a data transfer can be initiated and a retry status indicating that the transfer should be retried at a subsequent period of time.

67. The system of claim 65, wherein said status line is connected to a pull-up device and a data transfer abort status is driven onto said status line by said pull-up device.

68. The system of claim 67, wherein said pull-up device is a resistor.

69. The system of claim 65, wherein said pacing information comprises a stall transfer status indicating that a data transfer should be stalled and a continue status indicating that a stalled transfer should be continued.

* * * * *